United States Patent
Saito et al.

(10) Patent No.: US 8,315,975 B2
(45) Date of Patent: Nov. 20, 2012

(54) SYMBIOTIC WIDE-AREA FILE SYSTEM AND METHOD

(75) Inventors: Yasushi Saito, Mountain View, CA (US); Christos Karamanolis, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2361 days.

(21) Appl. No.: 10/315,583

(22) Filed: Dec. 9, 2002

(65) Prior Publication Data

US 2004/0111441 A1 Jun. 10, 2004

(51) Int. Cl.
*G06F 17/30* (2006.01)
(52) U.S. Cl. ......................................................... 707/610
(58) Field of Classification Search .................... 707/10, 707/204; 709/201, 241
See application file for complete search history.

(56) References Cited

U.S. PATENT DOCUMENTS

| | | | | |
|---|---|---|---|---|
| 5,276,797 | A * | 1/1994 | Bateman et al. | 715/823 |
| 5,825,759 | A * | 10/1998 | Liu | 370/331 |
| 5,963,962 | A * | 10/1999 | Hitz et al. | 707/202 |
| 6,167,427 | A * | 12/2000 | Rabinovich et al. | 709/201 |
| 6,256,675 | B1 * | 7/2001 | Rabinovich | 709/241 |
| 6,535,975 | B1 * | 3/2003 | Thompson et al. | 713/1 |
| 2006/0112154 | A1 * | 5/2006 | Douceur et al. | 707/204 |

OTHER PUBLICATIONS

Joseph P. Pickett, The American Heritage College Dictionary, 2002, Houghton Miflin Company, Fourth Edition pp. 8, 317, 604.*
http://web.archive.org/web/20011017190850/http://www.edonkey2000.com/overview.html.*
http://web.archive.org/web/19990429122650/http://www.teamtnt.com/mirror.htm.*
Microsoft Computer Dictionary, 2002, Microsoft Press, Fifth Edition pp. 162, 510.*
Peter Reiher et al., Resolving file conflicts in the Ficus File System, Jun. 1994 (ftp://ftp.cs.ucla.edu/pub/ficus/usenix_summer_94_resolver.ps.gz).*
Reiher, Peter (from Archive.org), On-Line Papers Published by Peter Reiher, Oct. 1999, UCLA, p. 2 (http://web.archive.org/web/19991007085100/http://ficus-www.cs.ucla.edu/project-members/reiher/available_papers.html).*
Reiher, Peter, On-Line Papers Published by Peter Reiher, Mar. 2006, UCLA, p. 4 (http://ficus-www.cs.ucla.edu/project-members/reiher/available_papers.html).*
archive.org, Search Results for Jan. 1, 1996-Mar. 22, 2006, Mar. 2006, www.archive.org, (http://web.archive.org/web/*/http://www.teamtnt.com/mirror.htm).*
archive.org, Frequently Asked Questions, Mar. 2006, www.archive.org, pp. 1 and 6.*
Microsoft, Microsoft Computer Dictionary, 2002, Microsoft Press, $5^{th}$ vol.*
www.usenix.org, USENIX Summer 1994 Technical Conference, 1994, USENIX.*
Bolosky, William R et al., "Feasibility of a serverless distributed file system deployed on an exiting set of desktop PCCs". In ACM SIGMETRICS, pp. 34-43, Jun. 2000.
Minkyong, Kim et al., "Safety, visibility, and performance in a wide-area file system". In FAST. Usenix, Jan. 2002. 14 pages.

(Continued)

*Primary Examiner* — Etienne Leroux

(57) ABSTRACT

In one embodiment, the invention provides a method and apparatus for a wide area file system, including: creating a peer-to-peer wide-area file system that allows read and write sharing of data. In another embodiment, the invention provides a method and apparatus for a wide area file system, including using per-file replication to achieve high availability and performance in the wide-area distributed file system.

15 Claims, 21 Drawing Sheets

OTHER PUBLICATIONS

Mohan, C., "A databaase perspective on Lotus Domino/Notes." In ACM SIGMOD, p. 507, May 1999.

Mummert, Lily, et al., "Exploiting weak connectivity for mobile file access". In SOSP, pp. 174-187, Oct. 2001.

Muthitacharoen, Athicha, et al., "A low-bandwidth network file system". In SOSP, pp. 174-187, Oct. 2001.

Petersen, Karin, et al., "Flexible update propagation for weakly consistent replication". In SOSP, pp. 288-301, Oct. 1997.

Ratner, David., "Roam: A Scalable Replication System for Mobile and Distributed Computing". PhD thesis, UC Los Angeles, 1998.

Spence, Susan, et al., "Adaptive consistency-patterns of sharing in a networked world". Technical report, HP Labs, 2002.

Van Renesse, R, et al., "A gossip-style failure detection service". In IFIP Int. Conf. on Dist. Sys. Platforms and Open Dist. Proc. (Middleware), 1998.

Fox, Armando et al., "Harvest, yield, and scalable tolerant systems", in 6th Workshop on Hot Topics in Operating Systems (HOTOS-VI), pp. 174-178, Rio Rico, AZ, Mar. 1999.

Yu, Haifeng et al., "The Costs and Limits of Availability for Replicated Services", In 18th Symposium on Operating System Principles (SOSP), pp. 29-42 Lake Louise, AB, Canada Oct. 2001.

Vogels, Werner,"File system usage in Windows NT 4.0", in 17th Symposium on Operating System Principles (SOSP), pp. 93-109, Kiawah Island, SC, Dec. 1999.

Kawell, Leonard et al., "Replicated document management in a group communication system", in Conference on Computer-Supported Coop. Work (CSCW), Chapel Hill, N.C. Oct. 1988, 10 pages.

Golding, Richard et al., "The refdbms distributed bibliographic database system", in USENIX Winter Tech. Conference, San Francisco Jan. 1994, 19 pages.

Terry, Douglas et al., "Managing update conflicts in Bayou, a weakly connected replicated storage system", in 15th Symposium on Operating System Principles (SOSP), pp. 172-183, Copper Mountain, CO Dec. 1995.

Walker, Bruce et al., The LOCUS distributed operating system, in 9th Symposium on Op. Sys. Principles (SOSP), pp. 49-70, Bretton Woods, NH Oct. 1983.

Kumar, Puneet et al., "Flexible and Safe Resolution of File Conflicts", in USENIX Winter Tech. Conf., pp. 95-106, New Orleans, LA Jan. 1995.

Mazieres, David, "A toolkit for user-level file systems", in USENIX Annual Technical Conference, Boston, MA Jun. 2001, 14 pages.

Francis, Paul et al., "IDMaps: A global Ingernet Host Distance Estimation Service", IEEE/ACM Trans. on Networking (TON), pp. 525-540, Oct. 2001.

Ji, Minwen et al., "Archipelago: An Island-Based File System for Highly Available and Scalable Internet Services", in USENIX Windows Systems Symposium, Aug. 2000, 12 pages.

Psounis, Konstantinos et al., "A randomized web-cache replacement scheme", in Infocom, Anchorage, AL. Apr. 2001, 9 pages.

Cao, Pei et al., "Cost-Aware WWW Proxy Caching Algorithms", in 1st USENIX Symp. on Internet Tech. and Sys. (USITS), Monterey, CA. Dec. 1997, 14 pages.

Grahn, Hakan et al., "Implementation and.evaluation of update-based cache protocols under relaxed memory consistency models, Future Generation Computer Systems", Jun. 1995, 32 pages.

Callaghan, B. et al., "RFC1813: NFS version 3 protocol specification", Jun. 1995, 113 pages.

Demers, Alan et al., "Epidemic algoriths for replicated database maintenance", in 6th Symp. on Princ. of Distr. Comp. (PODC), pp. 8-32, Vancouver, BC, Canada, Aug. 1987.

Gray, Jim, "A census of Tandem system availability between 1985 and 1990", IEEE Trans. on Reliability, pp. 409-418, Oct. 1990.

Howard, John et al., "Scale and performance in a distributed file system, ACM Trans. on Comp. Sys. (TOCS)", 1988, 30 pages.

Saito, Yasushi et al., "A Usenet Performance Study", Sep. 1998, 22 pages.

\* cited by examiner

Key attributes of a replica

```
struct Replica
    fid: FileID              // 96 bit globally unique file ID
    ts: TimeStamp            // Pair of hphysicak clock, IP addri
    vv: VersionVector        // Maps IP addr 7: TimeStamp
    goldPeers: Set (NodeID)  // Set of IP addresses
    peers: Set (NodeID)
    backptrs: Set (FileID, String)   // Pair of hdirID, fnamei
    ...
end
struct DirEntry
    fname: String
    fid: FileID
    downlinks: Set(NodeID)
    ts: Timestamp
end
```

*Figure 3*

A flooding algorithm to distribute updates. This code
assumes that updates are issued one at a time; the handling
of concurrent updates is discussed in Section 5.2.

r: Replica being updated.
when Update is newly issued
    Log (r. fid, r.vvi)
    Send (r. fid, r.vv, r.data) to nodes in r.peers
    Unlog r.fid, r.vv) after all the neighbors reply.
When Update (fid, vv, data) is received from node n.
    if this update has already been applied then Reply to n
    also Log and apply the updates.
        Reply to n
        Forward the update to r.peers − (n)
        Unlog after all the neighbors reply.

*Figure 6*

HARBINGER EXAMPLE
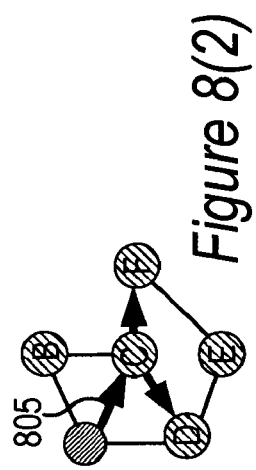
*Figure 8(1)*
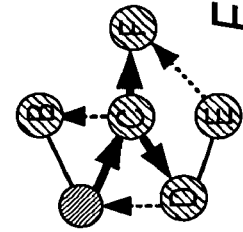
*Figure 8(2)*
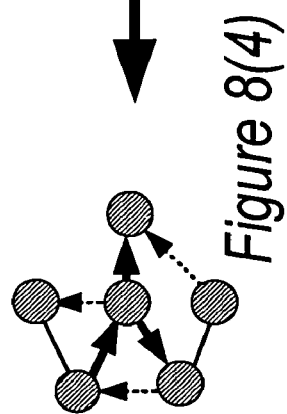
*Figure 8(3)*
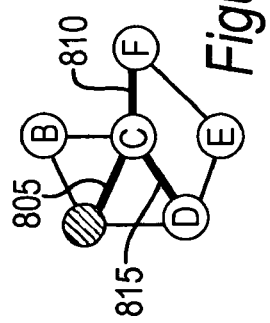
*Figure 8(4)*
*Figure 8*

```
50: ts=2, d=({51, foo, 4}, {52, alice, 5}, {53, bob, 6})
51: bp= {50, foo}, ts=4
52: bp=50, alice}, ts=5, d={ }
53: bp={50, bob}, ts=6, d={ }
```

*Figure 9(1)*

```
50: ts=8, d=({51, *foo, 8},
              {52, alice, 5},
              {53, bob, 6})
51: bp= {52, foo}, ts=8
52: bp= {50, alice}, ts=8,
        d=({51, foo, 8})
53: bp= {50, bob}, ts=6, d={ }
```

*Figure 9(2)*

```
50: ts=9, d=({51, *foo, 9), 9}
             {52, alice, 5},
             {53, bob, 6})
51: bp= {53, foo}, ts=9
52: bp= {50, alice}, ts=5, d= { }
53: bp= {50, bob}, ts=9,
        d=({51, foo, 9})
```

*Figure 9(3)*

```
50: ts=9, d=({51, *foo, 9}, {52, alice, 5}, {53, bob, 6})
51: bp= {53, foo}, ts=9
52: bp=50, alice}, ts=10, d= ( 51, *foo, 8 })
53: bp={50, bob}, ts=9, d= {51, foo, 9 })
```

|  | pang-1 | pang-2 | pang-3 | pang-4 | NFS | Coda-s | Coda-w | ext3 |
|---|---|---|---|---|---|---|---|---|
| Mkdir | 2.04 | 2.04 | 2.18 | 2.28 | 0.316 | 2.25 | 0.047 | 0.021 |
| copy | 3.40 | 3.79 | 3.85 | 3.90 | 3.50 | 201.0 | 0.85 | 0.264 |
| stat | 0.91 | 0.90 | 0.90 | 0.91 | 0.87 | 0.86 | 0.86 | 0.162 |
| grep | 2.09 | 2.11 | 2.13 | 2.13 | 2.20 | 1.22 | 1.20 | 0.925 |
| compile | 72.4 | 75.3 | 75.8 | 75.9 | 77.2 | 90.2 | 62.1 | 61.5 |
| Total | 82.84 | 84.14 | 84.86 | 85.12 | 84.08 | 295.5 | 65.05 | 62.87 |

*Figure 11*

| Pang-1 | pang-2 | | pang-3 | | pang-4 | | NFS | coda-w | coda-s |
|---|---|---|---|---|---|---|---|---|---|
| Bytes | Bytes | Overhead | Bytes | Overhead | Bytes | Overhead | Bytes | Bytes | Bytes |
| create | 0 | 248 | 0% | 1.29K | 60% | 2.61K | 68% | 503 | 1.46K | 1.96K |
| write 1B | 0 | 323 | 0% | 854 | 61% | 2.01K | 68% | 667 | 944 | 935 |
| write 50KB | 0 | 52.04K | 0% | 104.98K | 1.49% | 157.44K | 1.52% | 53.21K | 55.56K | 82.13K |
| write 25MB | 0 | 26.22M | 0% | 52.44M | 0.01% | 78.67M | 0.02% | 26.76M | 1.56K | 38.75M |

*Figure 13*

SYMBIOTIC WIDE-AREA FILE SYSTEM AND METHOD

TECHNICAL FIELD

Embodiments of the present invention relate generally to distributed file systems, replication, membership protocols, mobile computing, nomadic computing, and/or peer-to-peer distributed systems.

BACKGROUND

Some examples of traditional local-area distributed file systems include at least the following. NFS (Network File System) is a network file system designed for local area networks, and follows a client-server model. NFS relies on periodic polling to keep the cached data fresh. Thus, in a wide area network, NFS forces the clients to refresh data incessantly, thus rendering NFS as very inefficient. The availability of a file is limited by the availability of the server on which the file resides. Scalability is achieved by adding more servers and more volumes; the mapping of servers-volumes-namespace is manual.

AFS (Andrew File System) is a wide-area distributed file system that provides a unified file system under a single, global namespace. The wide-area system is organized in a number of "cells", with one cell in each physical location. Each cell comprises one or more servers. AFS utilizes persistent caching and callbacks. Write operations are flushed synchronously on the server. The "master copy" of a file resides on a single server. Thus, its availability (for open and write) depends on the availability of the server. Scalability is achieved by adding more servers and more volumes; the mapping of servers-volumes-namespace is semi-manual.

Coda adds to AFS two new modes of operations: "weakly connected" and "disconnected". In the case of disconnection or server failure, the client (transparently) switches to the disconnected mode and the user continues to read and write locally the cached files (that have been accessed before). However, the user cannot access files that have not been cached locally, and if the same files are updated by other clients, the changes are not visible to this client.

Roam, Ficus, and Bayou are three systems that aim at supporting mobile and/or often-disconnected users. Data are replicated on the local computer of the user. Data are synchronized with the other nodes/servers in the system, explicitly—either periodically or upon a user's request.

CFS (Cooperative File System) is mostly a read-only file repository built in a peer-to-peer fashion. Data locations are chosen randomly (for availability and/or reliability) on a per-block basis. Each user owns a separate name space, and updates to the namespace can be made only by that user. The design of CFS aims at reliability and load-balancing, but not at performance; multiple network hops may occur for each block access.

Oceanstore is a file repository, aimed to provide archival storage. Oceanstore implements a flat hash table on top of a peer-to-peer infrastructure, for placing file replicas; it employs an efficient and fault-tolerant routing algorithm to locate replicas. Locating and accessing a replica of a file may take many network hops.

Name services (such as Domain Name System, Clearinghouse, and Active Directory) use extensive caching to achieve high performance (i.e., low response latency). Data updates (e.g., changing a name zone) happen asynchronously, at the cost of less consistency across the system between cached and authoritative data. In these name services, there is no support of any file-like abstractions.

Thus, the current distributed file systems are limited in speed, availability, and/or network economy, and suffer from various constraints.

SUMMARY OF EMBODIMENTS OF THE INVENTION

In one embodiment, the invention provides a method and apparatus for a wide area file system, including: creating a peer-to-peer wide-area file system that allows read and write sharing of data.

In another embodiment, the invention provides a method and apparatus for a wide area file system, including using per-file replication to achieve high availability and performance in the wide-area distributed file system.

In yet another embodiment, the invention provides a server including: a protocol handler configured to receive requests from a client device to access a file; a replication engine configured to create a replica of a file in response to an initial access to a file; a log module configured to log replica-update operations to a replica; and a membership module configured to provide the information to permit the replication engine to make decisions on integration, updates, requests functions.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 shows the key attributes of a replica, in accordance with an embodiment of the invention.

FIG. 6 shows a method for propagating updates by flooding updates along graph edges, in accordance with an embodiment of the invention.

FIGS. 8(1)-(4) are block diagrams showing a method of update propagation for a file with six replicas A to F, in accordance with an embodiment of the invention.

FIGS. 9(1)-9(4) illustrate a method of resolving a conflict scenario, in accordance with an embodiment of a system of the invention.

FIG. 11 is a table showing Tcl benchmark results in a LAN environment, in accordance with embodiments of the invention.

FIG. 13 is a table showing network bandwidth consumption for common file-system update operations, in accordance with an embodiment of the invention.

DETAILED DESCRIPTION OF PREFERRED EMBODIMENTS

Figure 1:
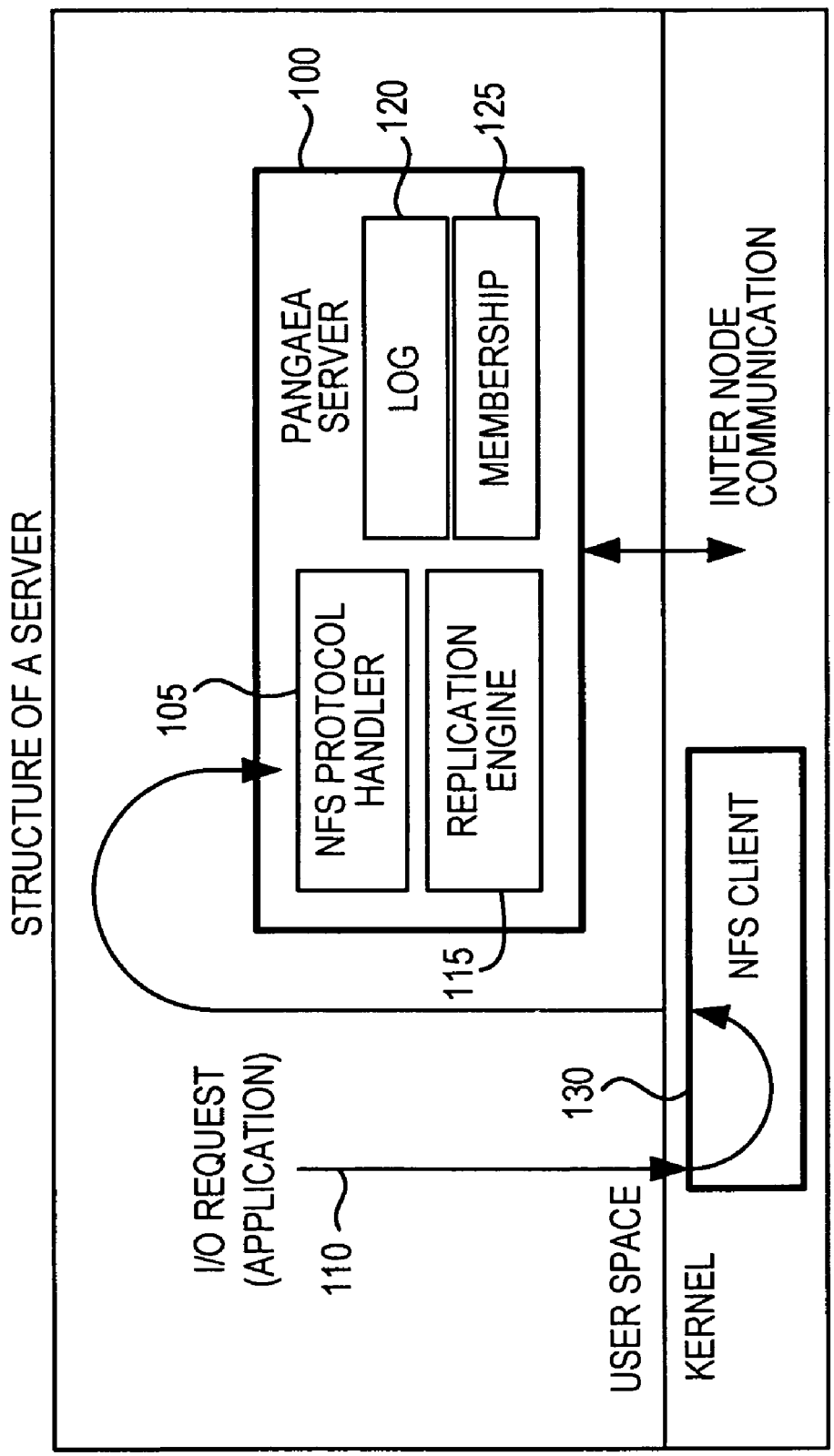
FIG. 1 is a block diagram of a server, in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

1. Introduction

An embodiment of the invention broadly provides wide-area file system that supports data sharing among a community of widely distributed users. One embodiment of the system is implemented as the "Pangaea" system by Hewlett-Packard Company, Palo Alto, Calif. The system is built on a symmetrically decentralized infrastructure that includes commodity computers (e.g., servers or nodes) provided by the end users. The computers are typically widely distributed and are connected by, for example, local-area networks or wide-area networks. The computers act autonomously to serve data to their local users. When possible, the computers exchange data with nearby peers to improve the system's overall performance, availability, and network economy. In an embodiment, the system creates a replica of a file (or directory) whenever and wherever the file is accessed.

In an embodiment, the system can provide various advantages such as speed, availability/autonomy, and/or network economy. Speed is achieved by hiding the wide-area networking latency. Thus, file access speed should resemble that of a local file system.

The system avoids depending on the availability of any specific node. Thus, the system adapts automatically to server additions, removals, failures, and/or network partitioning.

The system minimizes the use of wide-area networks. Nodes are not distributed uniformly. For example, some nodes are in the same LAN (Local Area Network), whereas some other nodes are half way across the globe. The system could transfer data between nodes in physical proximity, when possible, to reduce latency and save network bandwidth. In an embodiment, the system comprises a symbiotic design to achieve these goals in dynamic, wide-area environments. In such a system, each server functions autonomously and allows reads and writes to its files even when the server is disconnected. In other words, each server should be able to function autonomously, and serve to its users most of the server's files even when the server(s) is disconnected. However, as more computers become available, or as the system configuration changes, servers dynamically adapt and collaborate with each other, in a way that enhances the overall performance and availability of the system. The system realizes symbiosis by pervasive replication. It aggressively creates a replica of a file or directory whenever and wherever it is accessed. There is no single "master" replica of a file. Any replica may be read from or written to at any time, and replicas exchange updates among themselves in a peer-to-peer fashion. "It will be recognized to those of ordinary skill in the art that when described herein as a replica performing some action, such as replicas exchanging updates among themselves, this refers to the node (e.g., server) on which the replica resides performing such action. Thus, when referring, for example, to replicas exchanging updates among themselves in a peer-to-peer fashion, this refers to the nodes (e.g., servers) on which the replicas reside exchanging the updates in a peer-to-peer fashion." Pervasive replication achieves high performance by serving data from a server close to the point of access, high availability by letting each server contain its working set, and network economy by transferring data among close-by replicas.

1.1 Graph-based Replica Management

Discussed below are details on methods for permitting pervasive replication of files or directories. In an embodiment, a system capable of replica management satisfies three goals. First, the system supports a large number of replicas, in order to maximize availability. Second, the system manages the replicas of each file independently, since it is difficult to predict file-access patterns accurately in a wide area. Third, the system supports the dynamic addition and removal of replicas even when some nodes are not available. An embodiment of the invention addresses these challenges by maintaining a sparse, yet strongly connected and randomized graph of replicas for each file. As discussed below, the replicas of a file and the edges (known connections) between the replicas comprise a strongly connected "graph". Thus, a graph is typically formed by a plurality of replicas that are randomly connected. The graph is used both to propagate updates and to discover other replicas during replica addition and removal. This sparse graph of replicas offers three important benefits: available and inexpensive membership management, available update distribution, and/or network economy.

Available and inexpensive membership management: In an embodiment, a replica can be added by connecting to a few "live" replicas that the system discovers, no matter how many other replicas are unavailable. A live replica is a replica stored on a functional computer. A "dead" replica is stored on an unresponsive (i.e., either dead or really slow) computer. Since the graph is sparse, adding or removing a replica typically involves only a constant cost, regardless of the total number of replicas.

Available update distribution: In an embodiment, the system can distribute updates to all live replicas of a file as far as the file's graph is connected. The redundant and flexible nature of graphs makes them extremely unlikely to be disconnected even after multiple node or link failures.

Network economy: In an embodiment, the system has random-graph design that facilitates the efficient use of wide-area network bandwidth, for a system with an aggressive replication policy. The system achieves this by clustering replicas in physical proximity tightly in the graph, and by creating a spanning tree along faster edges dynamically during update propagation.

1.2 Optimistic Replica Coordination

A distributed service faces two inherently conflicting challenges: high availability and strong data consistency (see, Armando Fox and Eric A. Brewer, Harvest, yield, and scalable tolerant systems, in 6*th Workshop on Hot Topics in Operating Systems (HOTOS-VI)*, pages 174-178, Rio Rica, Ariz., USA, March 1999, and Haifeng Yu and Amin Vandat, The Costs and Limits of availability for Replicated Services, in 18*th Symposium on Operating System Principles (SOSP)*, pages 29-42, Lake Louise, AB, Canada, October 2001). An embodiment of the invention aims at maximizing availability: at any time, users of the system can be able to read and write any replica and the system can create or remove replicas without blocking. To address this challenge, the system, uses two techniques for replica management. First, the system pushes updates to replicas rather than invalidating them, since the pushing of updates achieves higher availability in a wide area by keeping up-to-date data in more locations. This approach may result in managing unnecessary replicas, wasting both storage space and networking bandwidth. To ameliorate this potential problem, the system lets each node (i.e., each server) remove inactive replicas, as discussed below.

Second, the system manages the replica contents optimistically. It lets any node to issue updates at any time, propagates them among replicas in the background, and detects and resolves conflicts after they happen. Thus, system typically supports only "eventual" consistency, guaranteeing that a user sees a change made by another user in some unspecified future time. Recent studies, however, reveal that file systems face very little concurrent write sharing, and that users demand consistency only within a window of minutes (see, Susan Spence, Erik Riedel, and Magnus Karlsson, Adaptive consistency-patterns of sharing in a networked world, Technical Report HPL-SSP-2002-10, HP Labs, February 2002; and Werner Vogels, File system usage in Windows NT 4.0, in 17*th Symposium On Operating System Principles (SOSP)*, pages 93-109, Kiawah Island, S.C., USA, December 1999). In an embodiment, the system's actual window of inconsistency is around approximately 5 seconds in a wide area. In addition, an embodiment of the system may provide an option that synchronously pushes updates to all replicas and gives users confirmation of their update delivery, as discussed below. Thus, the system's consistency semantics are sufficient for the ad-hoc data sharing that the system targets.

2. Related Work

The system can harness nodes to improve the system's robustness and efficiency. First, it provides better availability. When a server crashes, there are always other nodes providing access to the files it hosted. Updates can be propagated to all live replicas even when some of the servers are unavailable. The decentralized nature of the system also allows any node to be removed (even permanently) transparently to users. Second, the system improves efficiency by propagating updates between nearby nodes, rather than between a client and a fixed server and, creating new replicas from a nearby existing replica. In a related work, the idea of fluid replication utilizes surrogate Coda servers placed in strategic (but fixed) locations to improve the performance and availability of a file system. Fluid replication is discussed in, for example, Minkyong Kim, Landon P. Cox, and Brian D. Noble, Safety, visibility, and performance in a wide-area file system, in *USENIX Conference on File and Storage Systems (FAST)*, Monterey, Calif., January 2002, Usenix, which is hereby fully incorporated herein by reference. Other method of replication are provided in mobile data-sharing services, such as Lotus Notes (see, Leonard Kawell Jr., Steven Beckhart, Timothy Halvorsen, Raymond Ozzie, and Irene Greif, Replicated document management in a group communication system, in *Conference on Computer-Supported Coop. Work (CSCW)*, Chapel Hill, N.C., USA, October 1988.), TSAE (Richard A. Golding, Darrell D. E. Long, and John Wilkes, The refdbms distributed bibliographic database system, in *USENIX Winter Tech. Conference*, San Francisco, Calif., USA, January 1994), Bayou (Douglas B. Terry, Marvin M. Theimer, Karin Petersen, Alan J. Demers, Mike J. Spreitzer, and Carl H. Hauser, Managing update conflicts in Bayou, a weakly connected replicated storage system. In 15*th Symposium on Operating System Principles (SOSP)*, pages 172-183, Copper Mountain, Colo., USA, December 1995), and Roam [David H. Ratner, *Roam: A Scalable Replication System for Mobile and Distributed Computing*, PhD thesis, UC Los Angeles, 1998, Tech. Report. no. UCLACSD-970044). However, these current systems lack replica location management and rely on polling, usually by humans, to discover and exchange updates between replicas. In contrasts, an embodiment of the invention provides a system that keeps track of replicas automatically and distributes updates proactively and transparently to all the users. Most of the current systems replicate at the granularity of the whole database (except for Roam, which supports subset replicas). In contrast, the files and directories in an embodiment of the invention are replicated independently, and some of its operations (e.g., "rename") affect multiple files, each replicated on a different set of nodes. Such operations demand a new protocol for ensuring consistent outcome after conflicts, as discussed below.

In one embodiment, the system offers a simple conflict resolution policy similar to that of Roam, Locus (see, Bruce Walker, Gerald Popek, Robert English, Charles Kline, and Greg Thiel, The Locus distributed operating system, in 9*th Symposium on Op. Sys. Principles (SOSP)*, pages 49-70, Bretton Woods, N.H., USA, October 1983), or Coda (see, P. Kumar and M. Satyanarayanan, Flexible and safe resolution of file conflicts, in *USENIX Winter Tech. Conf.*, pages 95-106, New Orleans, La., USA, January 1995). Typically, an embodiment of the invention can make no assumptions about the semantics of file-system operations.

In an embodiment, the system assumes trusted servers, but it dynamically replicates files at the edge to minimize the use of wide-area networks. In an embodiment, the system, unlike current approaches, may also provide extra machinery for conflict detection and resolution.

3. A Structural Overview

This section overviews the structure of an embodiment of a server (or node) and the major data structures that the server maintains. The system typically follows a symmetrically distributed approach. Each server can handle file-access requests from users. It is assumed that a user uses a single server during a log-in session (lasting, e.g., a few hours), so that on-demand replication improves file access latency (i.e., improves speed); the user may move between servers over time. Each server maintains local hard disks, which are used to store replicas of files and directories. Servers interact with each other in a peer-to-peer fashion to provide a unified file system in accordance with an embodiment of the invention.

3.1 Definitions

The terms node and server are used interchangeably. Nodes are automatically grouped into regions, such that nodes within a region have low round-trip times (RTT) between them (e.g., less than approximately 5 milliseconds in one implementation). As used herein, the term "region" roughly corresponds to a geographical region. For example, if there is a group of computers in Palo Alto, Calif. and another group of computers in London, United Kingdom, then an embodiment of the system will recognize two regions. In practice, a "region" is defined in terms of physical proximity in the network (for example, computers that are in neighboring segments of the network or have low communication latency between them). Typically, this is also reflected in a geographic proximity as well. A server in an embodiment of the invention uses region information to optimize replica placement and coordination. A server in an embodiment of the invention replicates data at the granularity of files and treats directories as files with special contents. Thus, the applicants use the term "file" herein to refer to a regular file or a directory. It is noted that an embodiment of the invention treats a directory as a file with a special content. An "edge" represents a known connection between two replicas of a file; updates to the file flow along edges. The replicas of a file and the edges between the replicas comprise a strongly connected "graph". The set of replicas of a file is called the file's "replica set".

3.2 Structure of a Server

As shown in FIG. 1, a server 100 according to an embodiment of the invention is implemented as a userspace NFS (version 3) loopback server. FIG. 1 shows a possible implementation of the server, and other implementations are possible. In one embodiment of the invention, a plurality of servers form a symbiotic wide area file system as discussed herein. In an embodiment, a server 100 includes four main modules (105 to 125) as discussed below.

An NFS protocol handler 105 receives requests 110 from applications, updates local replicas, and generates requests for a replication engine 115. The handler 105 may be built, for example, by using the SFS toolkit that provides a basic infrastructure for NFS request parsing and event dispatching. The SFS toolkit is described in, David Mazières, A toolkit for user-level file systems, in *USENIX Annual Technical Conference*, Boston, Mass., USA, June 2001, which is hereby fully incorporated herein by reference.

The replication engine 115 accepts requests from the NFS protocol handler 105 and the replication engines 115 running on other nodes. The replication engine 115 creates, modifies, and/or removes replicas, and forwards requests to other nodes if necessary. The replication engine 115 is typically the largest part of the server 100. The operation of the replication engine 115 is described below in the replica set management in Section 4.

A log module 120 implements transaction-like semantics for local disk updates via redo logging. A transaction is a collection of operations on the physical and abstract application state (see, Jim Gray and Andreas Reuter "Transaction Processing: Concepts and Techniques", Morgan Kaufmann Publishers Inc, 1993, which is hereby fully incorporated herein by reference). A transaction may involve operations in multiple nodes of a distributed system. By transaction semantics in the literature, those skilled in the art usually refer to four properties: Atomicity, Consistency, Isolation, and Durability. The server 100 logs all the replica-update operations using this service, allowing the server to survive crashes.

A membership module 125 maintains the status of other nodes, including their liveness, available disk space, the locations of root-directory replicas, the list of regions in the system, the set of nodes in each region, and a round-trip time (RTT) estimate between every pair of regions. It is noted that the replicas keep track of each other (those graph links as described herein). The replication engine typically handles at least two tasks: (1) requests from the NFS protocol handler that need to be applied to the replicas of files, and (2) the replication engine coordinates with the replication engines on other nodes to propagate updates and perform other tasks. The replication engine uses the graph links associated with a local file replica to determine which nodes (and which replication engines associated with the nodes) to talk with regarding that file.

A remote node is live if it is functional (i.e., the remote node responds to requests from this node 100). Thus, the membership module 125 provides the information necessary to permit the replication engine 115 to make decisions on, for example, integration, updates, requests functions. In an embodiment, the membership module 125 runs an extension of van Renesse's gossip-based protocol, which is described in, Robert van Renesse, Yaron Minsky, and Mark Hayden, *A gossip-style failure detection service*, in IFIP Int. Conf on Dist. Sys. Platforms and Open Dist. (*Middleware*), 1998, which is hereby fully incorporated herein by reference. Each node periodically sends its knowledge of the nodes' status to a random node chosen from its live-node list; the recipient node merges this list with its own list. A few fixed nodes are designated as "landmarks" and they bootstrap newly joining nodes. The network administrator picks the landmarks and stores the information in a configuration file, which every server reads on startup. The protocol has been shown to disseminate membership information quickly with low probability of false failure detection. However, unlike an embodiment of the invention, Van Renesse's protocol did not have the notion of "regions", and did not keep round-trip time (RTT) estimates.

The region and RTT information is gossiped as part of the membership information. A newly booted node 100 obtains the region information from a landmark. The newly booted node 100 then polls a node in each existing region to determine where the polled node belongs or to create a new singleton region, where a singleton region is defined as a trivial region containing only the newly booted node 100. In each region, the node with the smallest IP (Internet Protocol) address elects itself as a leader and periodically pings nodes in other regions to measure the RTT. This membership-tracking scheme, especially the RTT management, is the key scalability bottleneck in an embodiment of the system; its network bandwidth consumption in a 10,000-node configuration is estimated to be approximately 10K bytes/second/node. An external RTT estimation services can be used, such as IDMaps, once they become widely available. IDMaps are described in, P. Francis, S. Jamin, C. Jin, Y. Jin, D. Raz, Y. Shavitt, and L. Zhang. IDMaps: A global Internet host distance estimation service. *IEEE/ACM Trans. on Networking (TON)*, 9(5):525-540, October 2001, which is hereby fully incorporated herein by reference.

The NFS client 130 can process the I/O requests and responses between an application and the server 100. Typically, the NFS client 130 is located in the kernel, while the server 100 is located in the user space.

3.3 Structure of a File System

Figure 2:
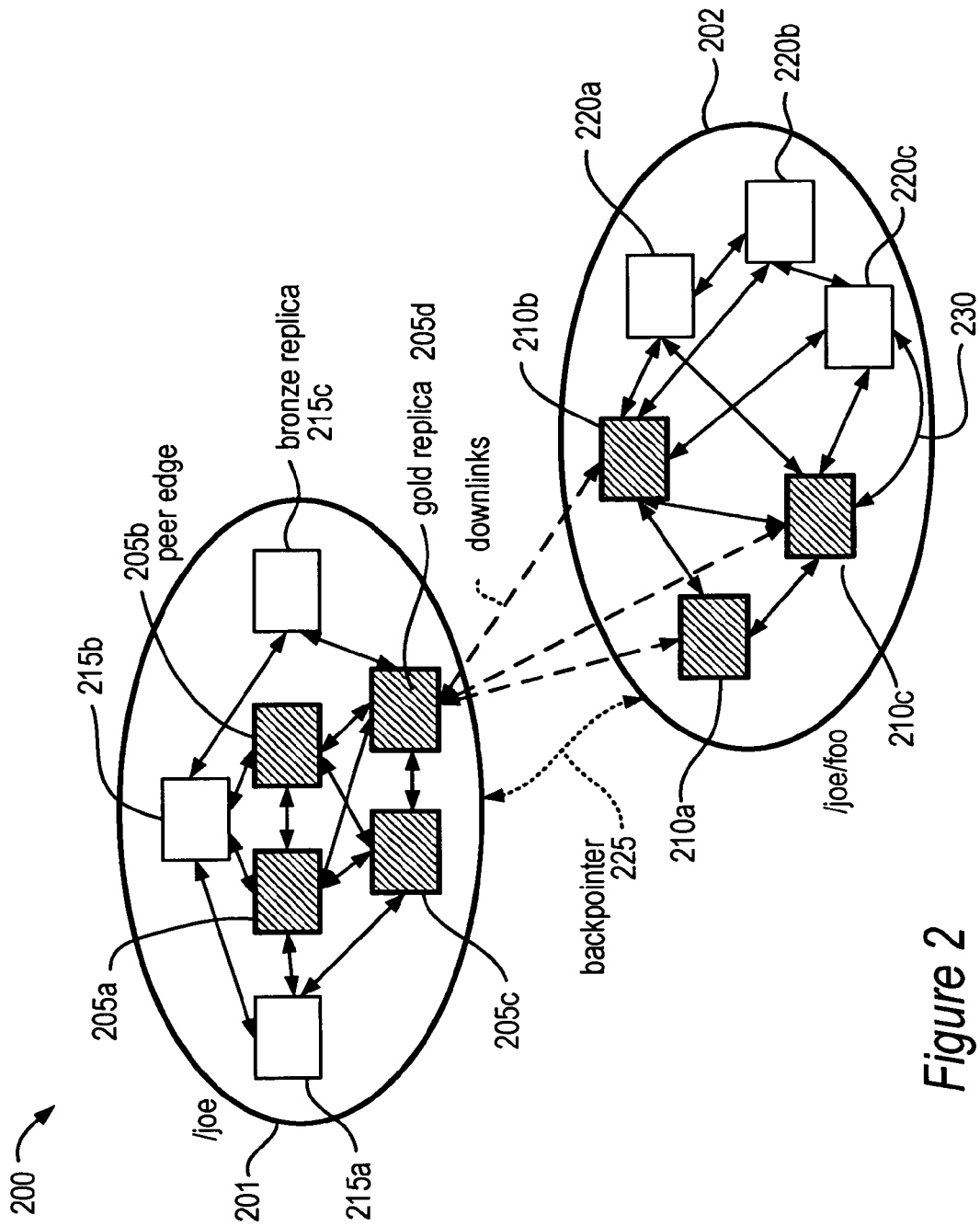
FIG. 2 is a block diagram illustrating an example directory and file, along with gold and bronze replicas, in accordance with an embodiment of the invention.

In an embodiment, a server 100 decentralizes both the replica-set and consistency management by maintaining a distributed graph of replicas for each file. FIG. 2 shows an example of a system 200 with two files, i.e., director/joe (201)-and file /joe/foo (202). The server 100 distinguishes two types of replicas: gold and bronze. For example, replicas 205a-205d and replicas 210a-210c are gold replicas, while replicas 215a-215c and replicas 220a-220c are bronze replicas. The gold replicas and bronze replicas are alternatively referred to as core replicas and non-core replicas, respectively. The two types of replicas can both be read and written by users at any time, and they both run an identical update-propagation protocol. Gold replicas, however, plan an additional role in maintaining the hierarchical name space. First, gold replicas act as starting points from which bronze replicas are found during path-name traversal. To this end, the director entry of a file lists the file's gold replicas (i.e., a directory points to gold replicas). Second, gold replicas perform several tasks that are hard to perform in a completely distributed way. In particular, the gold replicas are used as pivots to keep the graph connected after a permanent node failure, and to maintain a minimum replication factor for a file. They form a clique in the file's graph so that they can monitor each other for these tasks. These issues are discussed in more detail below in Section 4.

Currently, a server 100 (see FIG. 1) designates replicas created during initial file creation as gold and fixes their locations unless some of them fail permanently. Each replica stores a backpointer (e.g., backpointer 225 in FIG. 2) that indicates the location of the replica in the file-system name space. A backpointer includes the parent directory's ID (identifier) and the file's name within the directory. It is used for two purposes: to resolve conflicting directory operations (see Section 5.2 below), and to keep the directory entry up-to-date when the gold replica set of the file changes (see Section 6.2 below).

It is noted that a replica stores multiple backpointers when the file is hard-linked. A backpointer need not remember the locations of the parent-directory replicas, since a parent directory is always found on the same node due to the namespace-containment property (see Section 4.3).

The example of FIG. 2 illustrates a directory /joe (201) and a file /joe/foo (202). Each replica of joe stores three pointers to the gold replicas of foo. For example, the replica 205d is shown as having pointers to gold replicas 210a-210c of foo. Each replica of foo keeps a backpointer to the parent directory. For example, the replica 210a had a backpointer 225 to the parent directory /joe (201).

Bronze replicas are connected randomly to form strongly connected graphs. Bronze replicas also have uni-directional links to the gold replicas of the file, which are generally not shown in the drawings. For example, the bronze replica 220c has a uni-directional link 230 to the gold replica 210c and another uni-directional link to, for example, the gold replica 210b. The function of the uni-directional link from a bronze replica to the gold replicas is as follows. When some graph links disappear, then a new link must be created from doing a random walk starting from a gold replica. Thus, a bronze replica must know the location of the gold replicas. The replication engine 115 can determine the location of the gold replicas.

A gold replica is arbitrarily chosen, when the bronze replica is connected to that arbitrarily chosen gold replica.

FIG. 3 shows the key attributes of a replica. The timestamp (ts) and the version vector (vv) record the last time the file was modified. Their use is described in more detail below in Section 5. GoldPeers are uni-directional links to the gold replicas of the file. Peers point to the neighboring (gold or bronze) replicas in the file's graph.

4. Replica Set Management

In an embodiment of the invention, a replica is created by the replication engine 115 (FIG. 1) when a user first accesses a file, and a replica is removed by the replication engine 115 when a node runs out of disk space or the replication engine 115 finds a replica to be inactive. (An "inactive" replica is a replica that has not been accessed by the users on that node recently.) Because these operations are frequent, they are typically carried out efficiently and without blocking, even when some nodes that store replicas are unavailable. This section describes embodiments of algorithms based on random walks that achieve these goals.

4.1 File Creation

Figure 4:
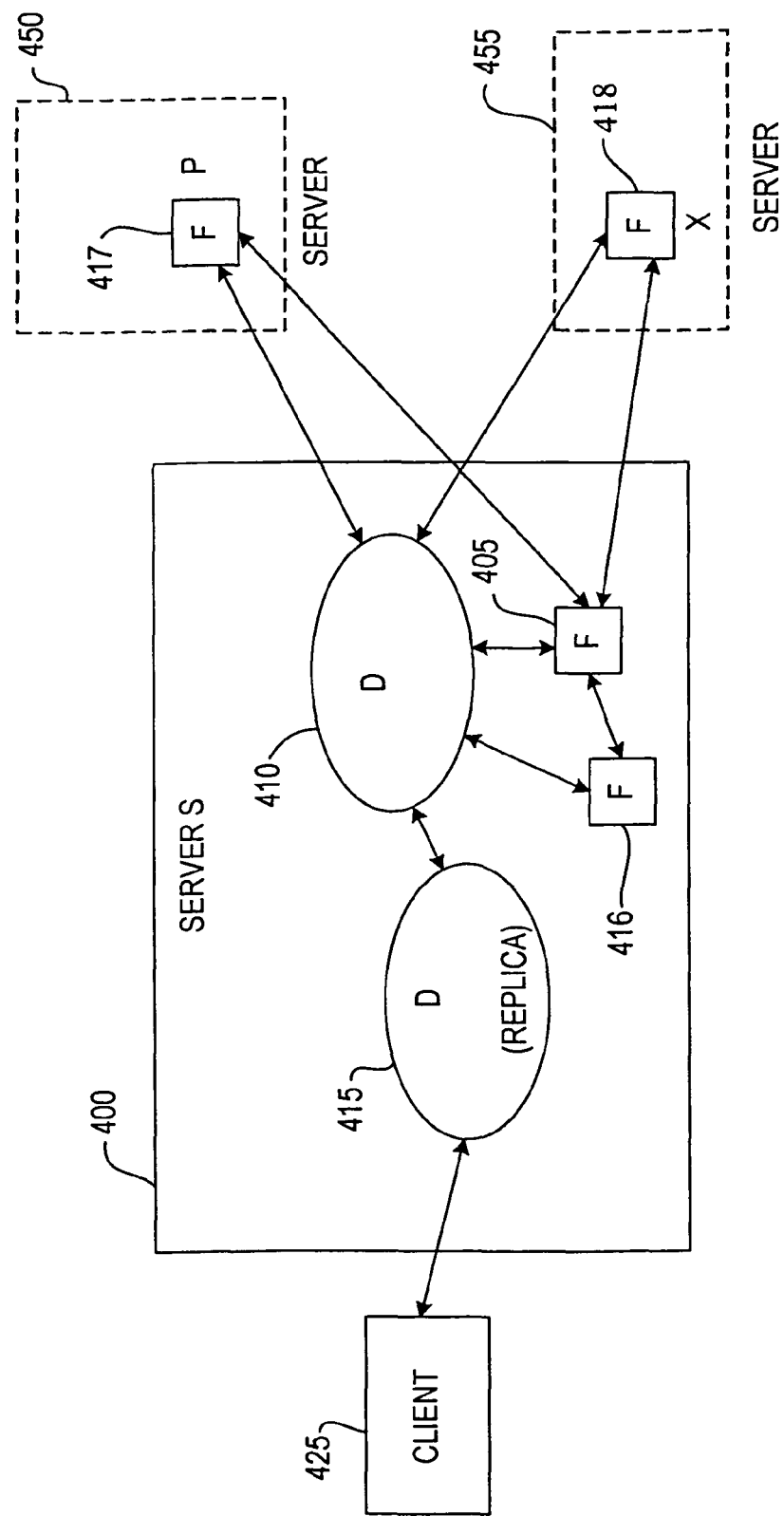
FIG. 4 is a block diagram showing a method of replication, in accordance with an embodiment of the invention.

The applicants now describe the interactions between the modules of the system 100 (FIG. 1) and the use of various data structures using a particular scenario—a user on server S (400) creates file F (405) in directory D (410) as illustrated in FIG. 4. For the moment, assume that server S already stores a replica 415 of directory D (if not, then server S creates a replica 415, using the protocol described in Section 4.2 below). First, the server S determines the location of g initial replicas of file F, which will become the gold replicas of the file F (a typical value for g is 3). One replica (e.g., replica 416) will reside on server S. The NFS client 130 performs the function of determining the location of initial replicas.

The other g-1 replicas (e.g., replicas 417 and 418) are chosen at random (by the replication engine 115) from different regions in the system to improve the expected availability of the file. For example, the replication engine 115 can pick one replica from Palo Alto, Calif. another replica from London, United Kingdom, and the final one replica from Bombay, India. That way, there is a good chance that some replicas will survive even after an unforeseen event such as a natural disaster or nuclear attack. In the example of FIG. 4, the replica 417 is in a server 450 in another region, while the replica 418 is in a server 455 in another region. Second, the replication engine 115 in the server S creates the local replica (416) for file F and adds an entry for file F in the local replica 415 of directory D. Thus, the local replica 416 of file F (405) is created on the node or server 400 that is being used by the user who requested to create the file F (405). The server S (400) then replies to the client 425, and the client 425 can start accessing the file F or a replica of file F.

In the background, the server S disseminates two types of updates. It first "floods" the new directory contents of directory D to other directory replicas of directory D. Server S also floods the contents of file F (which is empty, save for attributes such as permissions and owner) to its gold-replica nodes (e.g., nodes 450 and 455 which store the gold replicas 417 and 418, respectively, of file F). In practice, as described below in Section 5, in an embodiment, the applicants deploy several techniques to reduce the overhead of flooding dramatically. As a side effect of the propagation, the replicas of directory D (e.g., directory replica 415) will point to file F's gold replicas so that the latter can be discovered during future path-name lookups. As similarly discussed above, when a file is created, the node that initiates the creation has already a local replica of the parent directory (or creates a local replica of the parent directory if the local replica does not yet exist). Through the local replica of the parent directory, the node disseminates the new directory content (the locations—chosen as described above—of the g gold replicas of the new file) to all the replicas of the parent directory.

4.2 Replica addition

The protocol for creating additional replicas for a file is run when a user tries to access a file that is not present in the local node of the user. For example, suppose that a user on node S (e.g., server 400 in FIG. 4) wants to read file F. A read or write request is always preceded by a directory lookup (during the open request) on node S. Thus, to create a replica, node S must typically replicate the file's parent directory. This recursive step may continue all the way up to the root directory. The locations of root replicas are maintained by the membership service 125 (FIG. 1).

In an embodiment, the server 400 performs a short-cut replica creation to transfer data from a nearby existing replica. To create a replica of file F, node S first discovers the file's gold replicas in the directory entry during the path-name lookup. Node S then requests the file contents from the gold replica closest to node S (e.g., say gold replica P (417)). Gold replica P then finds a replica closest to node S among its own graph neighbors (e.g., say gold replica X (418), which may be gold replica P itself) and forwards the request to gold replica X, which in turn sends the contents to node S. The replication engine 115 of the node S (that stores the replicas) is performing the forwarding of the request to gold replica X. At this point, node S replies to the user and lets the user to start accessing the replica (via client 425).

This request forwarding is performed because the directory only knows file F's gold replicas, and there may be a bronze replica closer to gold replica P than the gold ones.

The new copy is integrated into the file's replica graph to be able to propagate updates to and receive updates from other replicas. Thus, in the background, node S chooses m existing replicas of F (where m is a parameter with a value that can vary), adds edges to them, and requests the m existing replicas chosen by node S to add edges to the new replica in node S. The replication engine 115 performs the above integration, updates, requests functions. The selection of m peers typically must satisfy three goals:

- Include gold replicas so that they have more choices during future short-cut replica creation.
- Include nearby replicas so that updates can flow through fast network links.
- Be sufficiently randomized so that, with high probability, the crash of nodes S does not catastrophically disconnect the file F's graph.

The node S (400) satisfies all these goals simultaneously, as a replica can have multiple edges. Typically, the node S (via replication engine 115) chooses three types of peers for the new replica. First, node S adds an edge to a random gold replica, preferably one from a different region than node S, to give that gold replica more variety of regions in its neighbor set. Second, node S asks a random gold replica, say e.g., gold replica P (417), to pick the replica (among gold replica P's immediate graph neighbors) closest to node S. The replication engine 115 in server 450 will perform the function of picking the replica closest to node S (among gold replica P's immediate graph neighbors). In the example of FIG. 4, the gold replica X (418) is determined and picked as the replica closest to node S. Third, node S asks gold replica P to choose m-2 random replicas using random walks that start from gold replica P and perform a series of RPC (Remote Procedure Calls) calls along graph edges. This protocol ensures that the resulting graph is m edge- and node-connected, provided that it was m-connected before.

Table 1 below illustrates and describes a protocol for adding a replica, in accordance with an embodiment of the invention.

TABLE 1

```
Protocol for adding a replica.
Constants:
    M: Number of neighbors per replica.
    MAXHOPS: The number of hops per a random walk (the
usual value is 3)

# AddReplica is the main procedure that adds
# a replica of file F on the executing node.

AddReplica(F, G)
    G: the set of gold replicas of F.
    (G is obtained by looking up the parent directory)
    g = Pick a random live node in G.
    Send to g, "CreateReplica(F, myself)"
    Wait for the contents to arrive.
    Store contents and reply the client.
    r = find the replica of F.
    Send to g, "StartRandomWalk(F, myself)"
    Wait for the set of neighbors N to arrive.
    for n in N:
        Add edge to n in r.
        Send to n, "AddEdge(F, myself)"
SendReplicaContents(F, Sender):
    F: the ID of the file
    Sender: the node requesting replica creation.
    r = find the replica of F
    n = pick the replica closest to Sender among graph
neighbors of r.
    Send to n, "SendReplicaContents(F, Sender)"
SendReplicaContents(F, Sender):
    F: the ID of the file
    Sender: the node requesting replica creation.
    r = find the replica of F
    Send r to Sender.
StartRandomWalk(F, Sender):
    F: the ID of the file
    Sender: the node requesting replica creation.
    r = find the replica of F
    N = { }
    for i = 0 to M-2:
        n = pick random graph neighbor in r.
        Send to n, "DoRandomWalk(F, 0, myself)"
        Receive nodeid from n.
        Add nodeid to N.
    Send N to Sender.
DoRandomWalk(F, hops, prevHopNode):
    F: the ID of the file
    hops: the number of hops made so far.
    if hops == MAXHOPS
        Send myself to prevHopNode
    else
        r = find the replica of F.
        n = pick random graph neighbor in r
        Send to n, "DoRandomWalk(F, hops + 1, myself)"
        Receive nodeid from n.
        Send nodeid to prevHopNode
AddEdge(F, peer):
    F: the ID of the file
    peer: the node to span edge to
    r = find the replica of F
    Add edge to peer in r
```

Parameter m trades off availability and performance. A small value increases the probability of graph disconnection (i.e., the probability that a replica cannot exchange updates with other replicas) after node failures. A large value for m increases the overhead of graph maintenance and update propagation by causing duplicate update delivery. The applicants have found that m=4 offers a good balance in a prototype of an embodiment of the invention.

4.3 Name-space Containment

The procedures for file creation and replica addition both require a file's parent directory to be present on a same node S. The server 400, in fact, typically demands that for every file, all intermediate directories, up to the root, are always replicated on the same node. An example of this is shown in FIG. 4, where a replica 415 of directory 410 is replicated on the same node 400. This name-space-containment requirement yields two benefits. First, it naturally offers the availability and autonomy benefits of island-based replication, which is discussed in M. Ji, E. Felten, R. Wang, and J. P. Singh, Archipelago: an island-based file system for highly available and scalable Internet services, in *USENIX Windows Systems Symposium*, August 2000, which is hereby fully incorporated herein by reference. That is, it enables lookup and access to every replica even when the server 400 is disconnected and allows each node to take a backup of the file system locally. Second, it simplifies the conflict resolution of directory operations, as discussed below. On the other hand, this requirement increases the system-wide storage overhead by approximate 1.5% to 25%, compared to an idealized scheme in which directories are stored on only one node. The applicants consider the overhead to be reasonable, as users already pay many times more storage cost by replicating files in the first place.

Due to the lack of wide-area file system traces, the applicants analyzed the storage overhead using a fresh file system with RedHat 7.3 installed. The overhead mainly depends on the spatial locality of accesses, i.e., the degree to which files in the same directory are accessed together. The applicants expect the overhead in practice to be much closer to 1.5% than 25%, because spatial locality in typical file-system traces is usually high.

4.4 Bronze Replica Removal

This section describes the protocol for removing bronze (non-core) replicas. Gold (core) replicas are typically removed only as a side effect of a permanent node loss. The applicants discuss the handling of permanent failures in Section 6 below.

Typically, a replica is removed for two possible reasons: because a node S has run out of disk space, or the cost of keeping the replica outweighs the benefits of storing the replica. To reclaim disk space, an embodiment of the invention uses a randomized GD-Size algorithm. A suitable randomized replacement algorithm is discussed in Konstantinos Psounis and Balaji Prabhakar, A randomized web-cache replacement scheme, inn *Infocom*, Anchorage, Ak., USA, April 2001, which is hereby fully incorporated herein by reference. The applicants examined fifty (50) random replicas kept in the node and calculate their merit values using the GD-Size function that considers both the replica's size and the last-access time (see also, Pei Cao and Sandy Irani, Cost-Aware WWW proxy caching algorithms, in 1*st USENIX Symp. on Internet Tech. and Sys.* (*USITS*), Monterey, Calif., USA, December 1997). The replica with the minimum merit is evicted, and five replicas with the next-worst merit values are added to the candidates examined during the next round. The algorithm is repeated until it frees enough space on the disk. Optionally, a server 400 can also reclaim replicas that are not worth keeping. Applicants currently use a competitive updates algorithm for this purpose (see also, Håkan Grahn and Per Stenstrom and Michel Dubois, Implementation and evaluation of update-based cache protocols under relaxed memory consistency models, *Future Generation Computer Systems*, 11(3), June 1995, which is hereby fully incorporated herein by reference). Here, the server keeps a per-replica counter that is incremented every time a replica receives a remote update and is reset to zero when the replica is read. When the counter's value exceeds a threshold (e.g., threshold of 4 in one embodiment that is implemented in a prototype), the server evicts the replica.

To remove a replica, the server 400 sends notices to the replica's graph neighbors. Each neighbor, in turn, initiates a random walk starting from a random gold replica and uses the protocol described in Section 4.2 above to establish a replacement edge with another live replica. The gold-replica set is kept as part of the replica's attributes as shown in FIG. 3. Starting the walk from a live gold replica ensures that the graph remains strongly connected. A similar protocol runs when a node detects another node's permanent death, as the applicants describe below in section 6.

Figure 5:
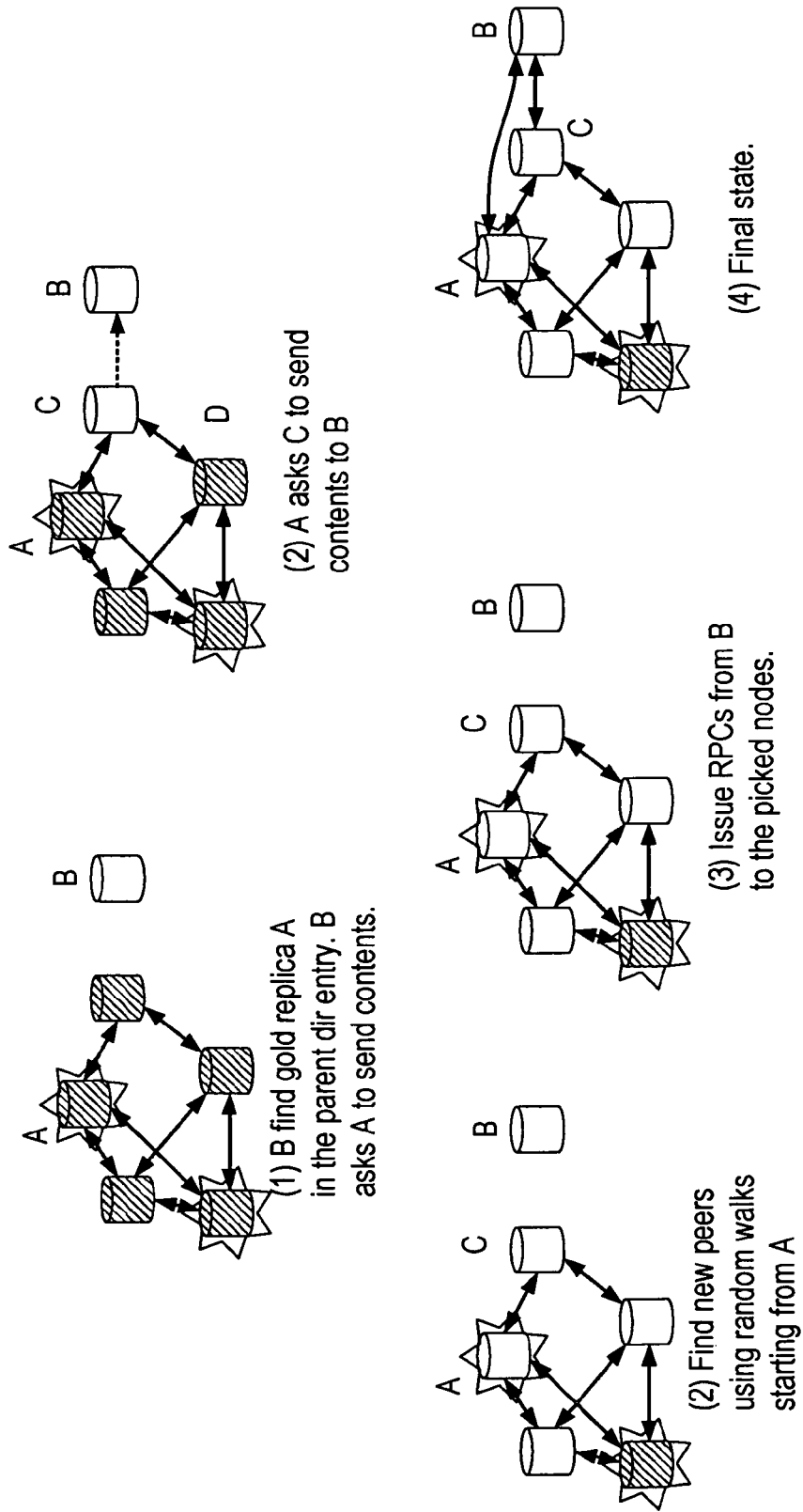
FIG. 5 are block diagrams showing a method of creating a bronze replica, in accordance with an embodiment of the invention.

As shown in FIG. 5, a bronze replica is created based on the following method. When a node B needs to create a local replica of a file X (e.g., because a local user tries to access the file X), node B already has a local replica of the parent directory of file X, say parent directory Y. This happens through the recursive lookup process for locating the file. So, B knows what are the gold replicas of X (they are listed in file X's entry in directory Y). Say one of the gold replicas of file X is on node A. Node B contacts node A to send the contents of file X. Node A, in turn, may ask node C which closer to node B and also has a replica of file X to send the contents of file X. The new replica of file X on node B is then connected to the pre-existing replicas of file X on node A and node C. RPCs are issued from node B to picked nodes A and C, in order to obtain a final state.

4.5 Summary and Benefits

The graph-based pervasive replication algorithms described in this section offer some fundamental benefits over traditional approaches that have a fixed set of servers manage replica locations.

Simple and Efficient Recovery from Failures:

Graphs are, by definition, flexible: spanning edges to any replica makes the graph incrementally more robust and efficient. Moreover, using just one type of edges both to locate replicas and to propagate updates simplifies the recovery from permanent failures and avoids any system disruption during graph reconfiguration.

Decoupling of Directories and Files:

Directory entries point only to gold replicas, and the set of gold replicas is typically stable. Thus, a file and its parent directory act mostly independently once the file is created. Adding or removing a bronze replica for the file does not require a change to the directory replicas. Adding or removing a gold or bronze replica for the directory does not require a change to the file replicas. These are key properties for the system's efficiency in one embodiment of the invention.

5. Propagating Updates

This section describes solutions of an embodiment of the invention to three challenges posed by optimistic replication: efficient and reliable update propagation, handling concurrent updates, and the lack of strong consistency guarantees.

5.1 Efficient Update Flooding

Figure 7:
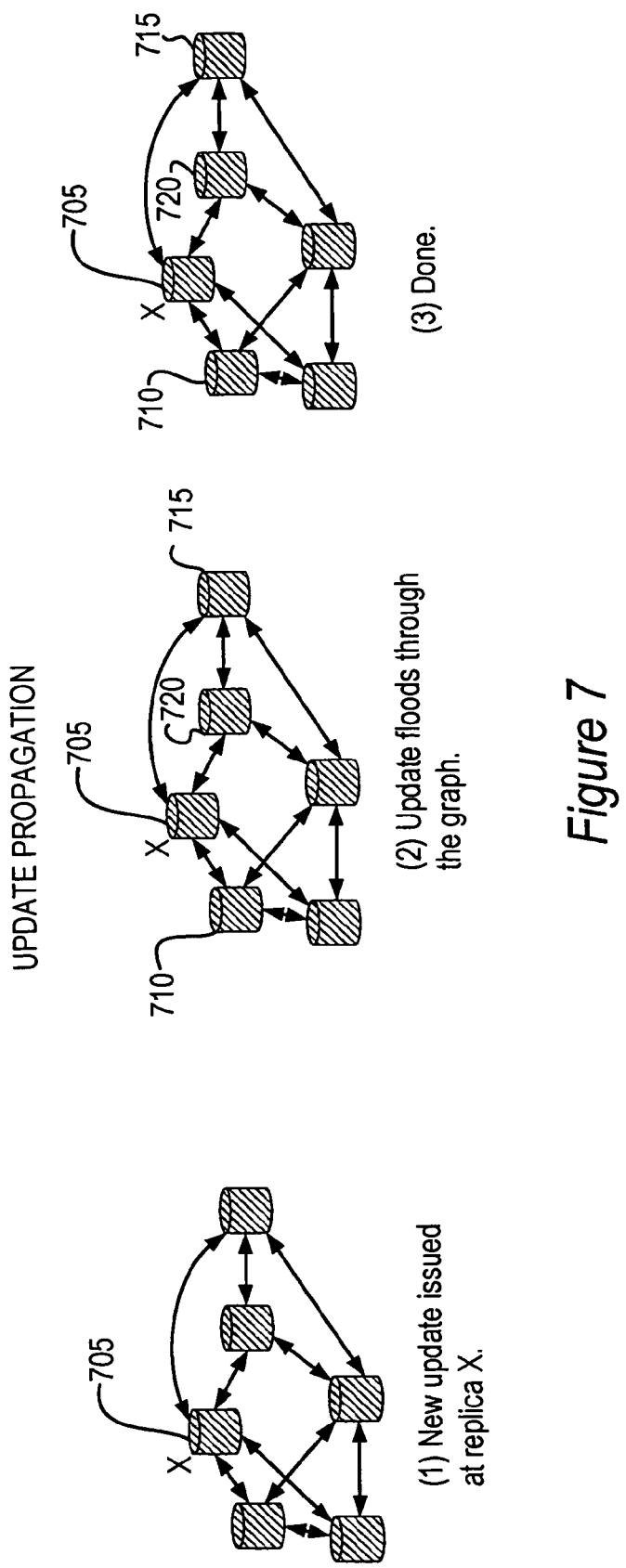
FIG. 7 are block diagrams showing a method of update propagation, in accordance with an embodiment of the invention.

The basic method for propagating updates in an embodiment of the invention is by flooding updates along graph edges, as shown in FIG. 6. Whenever a replica is modified on a server, the server pushes the entire file contents to all the graph neighbors, which in turn forward the contents to their neighbors, and so on, until all the replicas receive the new contents. For example, as shown in FIG. 7, if a new update is issued at replica X (705), then the updates will be forwarded to neighboring replicas 710, 715, and 720. The updates are flooded through the graph until the remaining replicas or all replicas receive the update. This flooding algorithm guarantees reliable update delivery as long as the replica graph is strongly connected.

The following three sections introduce techniques for improving the efficiency of a flooding algorithm in accordance with an embodiment of the invention.

5.1.1 Optimization 1: Delta Propagation

A major drawback of flooding is that it propagates the entire file contents even when only one byte has been modified. Delta propagation improves the propagation efficiency while maintaining the logical simplicity of flooding. Here, whenever a portion of a file is changed (e.g., adding an entry to a directory), an embodiment of the invention typically propagates only a small, semantic description of the change, called a "delta". Deltas, in general, must be applied in the same order to every replica to produce the same result. The applicants ensure this by having each delta carry two timestamps: the old timestamp that represents the state of the replica just before the change, and the new timestamp that shows the state of the replica after the change (see, Leonard Kawell Jr., Steven Beckhart, Timoty Halvorsen, Raymond Ozzie, and Irene Greif. Replicated document management in a group communication system. In *Conference on Comp.-Supported Coop. Work (CSCW)*, Chapel Hill, N.C., USA, October 1988, which is hereby fully incorporated herein by reference). A replica applies a delta typically only when its current timestamp matches the delta's old timestamp. Otherwise, it resorts to full contents transfer, with potential conflict resolution as described in Section 5.2. In practice, updates are handled almost exclusively by deltas, and full-state transfer happens only when there are concurrent writes, or when a node recovers from a crash.

A system of an embodiment of the invention further reduces the size of updates by delta merging, akin to the feature implemented in Coda (see, Lily B. Mummert, Maria R. Ebling, and M. Satyanarayanan, Exploiting weak connectivity for mobile file access, in $15^{th}$ *Symp. on Op. Sys. Principles (SOSP)*, pages 143-155, Copper Mountain, Colo., USA, December 1995, which is hereby fully incorporated herein by reference). For example, when a file is deleted right after it is modified (which happens often for temporary files), the server (via the replication engine 115) quashes the modification if it has not yet been sent to other replicas. Delta merging is transparent to users because it adds no delay to propagation.

5.1.2 Optimization 2: Harbingers

Flooding guarantees reliable delivery by propagating updates (deltas or full contents) over multiple links at each step of the algorithm. Thus, it consumes m times the optimal network bandwidth, where m is the number of edges per replica. Harbingers eliminate redundant update deliveries.

A system in an embodiment of the invention uses a two-phase protocol to propagate updates that exceed a certain size (e.g., 1 KB). In phase one, a small message that only contains the timestamps of the update, called a "harbinger", is flooded along graph edges. The update bodies are sent, in phase two, only when requested by other nodes. When a node receives a new harbinger, it asks the sender of the harbinger (the immediate upstream replica in the flooding chain) to push the update body. Simultaneously, it forwards the harbinger to other neighbors in the graph. When a node receives a duplicate harbinger without having received the update body, it asks its sender to retry later. This is typically required because the sender of the earliest harbinger may crash before sending the update body. If a node receives a harbinger after having received the update body, it tells the sender to stop sending the update. The applicants chose the harbinger threshold of 1 KB, because applicants found that delta sizes follow a bimodal distribution-one peak around 200 bytes representing directory operations, and a flatter plateau around 20 KB representing bulk writes. A system in an embodiment of the invention batches NFS write requests and flushes data to disk and other replicas only after a "commit" request (see, B. Callaghan, B. Pawlowski, and P. Staubach. RFC1813: NFS version 3 protocol specification, <http://info.internet.isi-.edu/in-notes/rfc/files/rfc1813.txt>, June 1995, which is hereby fully incorporated herein by reference). Thus, the size of an update can grow larger than the typical "write" request size of 8 KB.

This harbinger algorithm not only saves network usage, but also shrinks the effective window of replica inconsistency. When a user tries to read a file for which only a harbinger has been received, she waits until the actual update arrives. Since harbinger-propagation delay is independent of the actual update size, the chance of a user seeing stale file contents is greatly reduced.

5.1.3 Optimization 3: Exploiting Physical Topology

Harbingers have another positive side effect. They favor the use of fast links, because a node requests the body of an update from the sender of the first harbinger it receives. However, an unpredictable node or link load may reduce this benefit. A simple extension to the harbinger algorithm improves the data propagation efficiency, without requiring any coordination between nodes. Before pushing (or forwarding) a harbinger over a graph edge, a server adds a delay proportional to the estimated speed of the edge (10*RTT in an implementation of an embodiment of the invention). This way, the system dynamically builds a spanning tree whose shape closely matches the physical network topology. FIG. 8 shows an example. Applicants have found that this technique drastically reduces the use of wide-area networks when updating shared files.

FIG. 8 shows an example of update propagation for a file with six replicas, A to F. Thick edges 805, 810, and 815 represent fast links. In FIG. 8(1), an update is issued at replica A. In FIG. 8(2), replica A sends a harbinger via the thick edge 805 to replica C. Replica C forwards the harbinger to replica D and replica F quickly. In FIG. 8(3), replica D forwards the harbinger to replica E. After some time, replica A sends the harbinger to replica B, and a spanning tree is formed. Links not in the spanning tree are used as backups when some of the spanning tree links fail. In FIG. 8(4), the update's body is pushed along the spanning tree edges. In practice, the steps shown in FIGS. 8(2) to 8(4) proceed in parallel.

5.2 Conflict Resolution

With optimistic replication, concurrent updates are inevitable, although rare (see, Werner Vogels, File system usage in Windows NT 4.0, in 17*th Symp. on Op. Sys. Principles (SOSP)*, pages 93-109, Kiawah Island, S.C., USA, December 1999; Susan Spence, Erik Riedel, and Magnus Karlsson, Adaptive consistency-patterns of sharing in a networked world, Technical Report HPL-SSP-2002-10, HP Labs, February 2002). In an embodiment, the applicants use a combination of version vectors and the last-writer-wins rule to resolve conflicts. First, recall that when delta timestamps mismatch, servers revert to full-state transfer. Applicants then use version vectors (see, D. Scott Parker, Gerald Popek, Gerard Rudisin, Allen Stoughton, Bruce Walker, Evelyn Walton, Johanna Chow, David Edwards, Stephen Kiser, and Charles Kline, Detection of mutual inconsistency in distributed systems, *IEEE Transactions on Software Engineering*, SE-9(3): 240-247, 1983) to separate true conflicts from other causes (e.g., missing updates) that can be fixed simply by overwriting the replica. This advantageously simplifies conflict resolution. For conflicts on the contents of a regular file, applicants currently offer users two options. The first is the "last-writer wins" rule using update timestamps (see, attribute ts in FIG. 3). In this case, the clocks of servers should be loosely synchronized, e.g., using NTP, to respect the users' intuitive sense of update ordering. The second option is to concatenate two versions in the file and let the user fix the conflict manually. Other options, such as application-specific resolvers are possible (for resolvers, see, Bruce Walker, Gerald Popek, Robert English, Charles Kline, and Greg Thiel, The Locus distributed operating system, in 9*th Symp. on Op. Sys. Principles* (*SOSP*), pages 49-70, Bretton Woods, N.H., USA, October 1983; P. Kumar and M. Satyanarayanan, Flexible and safe resolution of file conflicts, in *USENIX Winter Tech. Conf.*, pages 95-106, New Orleans, La., USA, January 1995; Douglas B. Terry, Marvin M. Theimer, Karin Petersen, Alan J. Demers, Mike J. Spreitzer, and Carl H. Hauser, Managing update conflicts in Bayou, a weakly connected replicated storage system, in 15*th Symp. on Op. Sys. Principles* (*SOSP*), pages 172-183, Copper Mountain, Colo., USA, December 1995)

Conflicts regarding file attributes or directory entries are more difficult to handle. They fall into two categories. The first is a conflict between two directory-update operations; for example, Alice does "mv /foo/alice/foo" and Bob does "mv /foo/bob/foo" concurrently. In the end, it is desirable that one of the updates to take effect, but not both. The second category is a conflict between "rmdir" and any other operation; for example, Alice does "mv /foo/alice/foo" and Bob does "rmdir /alice". These problems are difficult to handle, because files may be replicated on different sets of nodes, and a node might receive only one of the conflicting updates and fail to detect the conflict in the first place.

The applicants' solution to the above problems is now discussed. The principle is always to let the child file ("foo" in our example), rather than its parent ("alice" or "bob"), dictate the outcome of the conflict resolution using the "last-writer-wins" rule. The file's backpointer (Section 3.3) will authoritatively define the file's location in the file-system namespace. Applicants implement directory operations, such as "mv" and "rm", as a change to the file's backpointer(s). When a replica receives a change to its backpointer, it also reflects the change to its parents by creating, deleting, or modifying the corresponding entries. The replica can always find a replica of the parent directory in the same node, because of the name-space-containment property. The parent directory will, in turn, flood the change to its directory replicas. In practice, applicants randomly delay the directory entry patching and subsequent flooding, because there is a good chance that other replicas of the file will do the same.

FIG. 9 illustrates how an embodiment of a system of the invention resolves the first conflict scenario. The same policy is used to resolve the mv-rmdir conflict: when a replica detects the absence of the directory entry corresponding to its backpointer, it re-creates the entry, which potentially involves re-creating the directory itself and the ancestor directories recursively, all the way to the root.

A directory in an embodiment of a system of the invention is, in effect, merely a copy of the backpointers of its children. Thus, resolving conflicts on directory contents is done by applying the "last-writer-wins" rule to individual entries. If a file is to be removed from a directory, the directory still keeps the entry but marks it as "dead" (i.e., it acts as a "death certificate" (see, Alan J. Demers, Daniel H. Greene, Carl Hauser, Wes Irish, and John Larson, Epidemic algorithms for replicated database maintenance, in 6*th Symp. on Princ. of Distr. Comp.* (*PODC*), pages 1-12, Vancouver, BC, Canada, August 1987)). As a result, a detection can be made when a stale change to the entry arrives in the future.

In FIG. 9, an example of a method of conflict resolution involves four files, "/" (FileID=50), "/foo" (FileID=51), "/alice?" (FileID=52), and "/bob/" (FileID=53). The attribute "ts-2" in FIG. 9(1) shows that the backpointer of the replicate indicates that the file has the name "foo" in the directory 50 ("/"). The attribute "d-{51,foo,4}" means that the director contains one entry, a file "*foo" with ID of 51 and timestamp of 4. Entries marked "*foo" are death certificates. In FIG. 9(1), two sites initially store the same contents. In FIG. 9(2), Alice does "mv/foo/alice/foo". In FIG. 9(3), Bob concurrently does "mv /foo /bob/foo" on another node. Because Bob's update has a new timestamp (ts=9) (see FIG. 9(3)), the method permits Bob's to win over Alice's. In FIG. 9(4), when Alice's node receives the update from Bob's, the replica of file 51 will notice that its backpointer has changed from [52, foo] to [53, foo]. This change triggers the replica to delete the entry from /alice and add the entry to /bob.

5.3 Controlling Replica Divergence

It would be advantageous to provide hard guarantees for the degree of replica divergence, instead of achieving consistency only eventually. Therefore, an embodiment of the system of the invention introduces an option, called the "red button", to provide users confirmation of update delivery. The red button, when pressed for a particular file, sends harbingers for any pending updates to neighboring replicas. These harbingers (and corresponding updates) circulate among replicas as described in Section 5.1.2. A replica, however, does not acknowledge a harbinger until all the graph neighbors to which it forwarded the harbinger acknowledge it or time out (to avoid deadlocking, a replica replies immediately when it receives the same harbinger twice). The user who pressed the red button waits until the operation is fully acknowledged or some replicas time out, in which case the user is presented with the list of unavailable replicas.

This option gives the user confirmation that her updates have been delivered to remote nodes and allows her to take actions contingent upon stable delivery, such as emailing her colleagues about the new contents. The red button, however, still does not guarantee a single-copy serializability, as it cannot prevent two users from changing the same file simultaneously.

6. Failure Recovery

Failure recovery in an embodiment of a system of the invention is simplified due to three properties: 1) the randomized nature of replica graphs that tolerate operation disruptions; 2) the idempotency of update operations, including NFS requests; and 3) the use of a unified logging module that allows any operation to be re-started.

Applicants distinguish two types of failures: temporary failures and permanent failures. They are currently distinguished simply by their duration—a crash becomes permanent when a node is suspected to have failed continuously for more than two weeks. Given that the vast majority of failures are temporary (see, Jim Gray, A census of Tandem system availability between 1985 and 1990, *IEEE Trans. on Reliability*, 39(4):409-418, October 1990; William J. Bolosky, John R. Douceur, David Ely, and Marvin Theimer, Feasibility of a Serverless Distributed File System Deployed on an Existing Set of Desktop PCs, in *Conference on Measurement and Modeling of Computer Systems* (*SIGMETRICS*), pages 34-43, Santa Clara, Calif., USA, June 2000), applicants set two different goals. For temporary failures, applicants try to reduce the recovery cost. For permanent failures, applicants try to clean all data structures associated with the failed node so that the system runs as if the node had never existed in the first place.

6.1 Recovering from Temporary Failures

Temporary failures are handled by retrying. A node persistently logs any outstanding remote-operation requests, such as contents update, random walk, or edge addition. A node retries logged updates upon reboot or after it detects another node's recovery. This recovery logic may sometimes create uni-directional edges or more edges than desired, but it maintains the most important invariant, that the graphs are m-connected and that all replicas are reachable in the hierarchical name space.

Figure 10A:
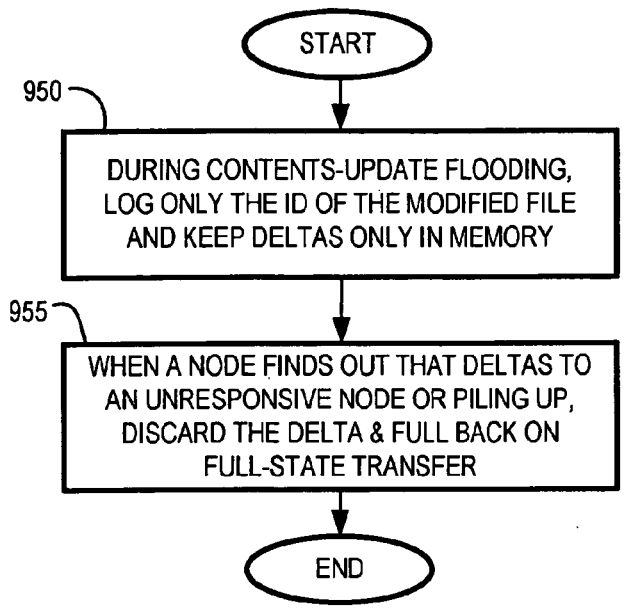
FIGS. 10A and 10B are flowcharts illustrating methods of failure recovery, in accordance with embodiments of the invention.

An embodiment oT a system of the invention reduces the logging overhead during contents-update flooding, by logging only the ID of the modified file and keeping deltas only in memory (step 950 in FIG. 10A). To reduce the memory footprint further, when a node finds out that deltas to an unresponsive node are piling up, the sender discards the deltas and falls back on full-state transfer (step 955).

6.2 Recovering from Permanent Failures

Figure 10B:
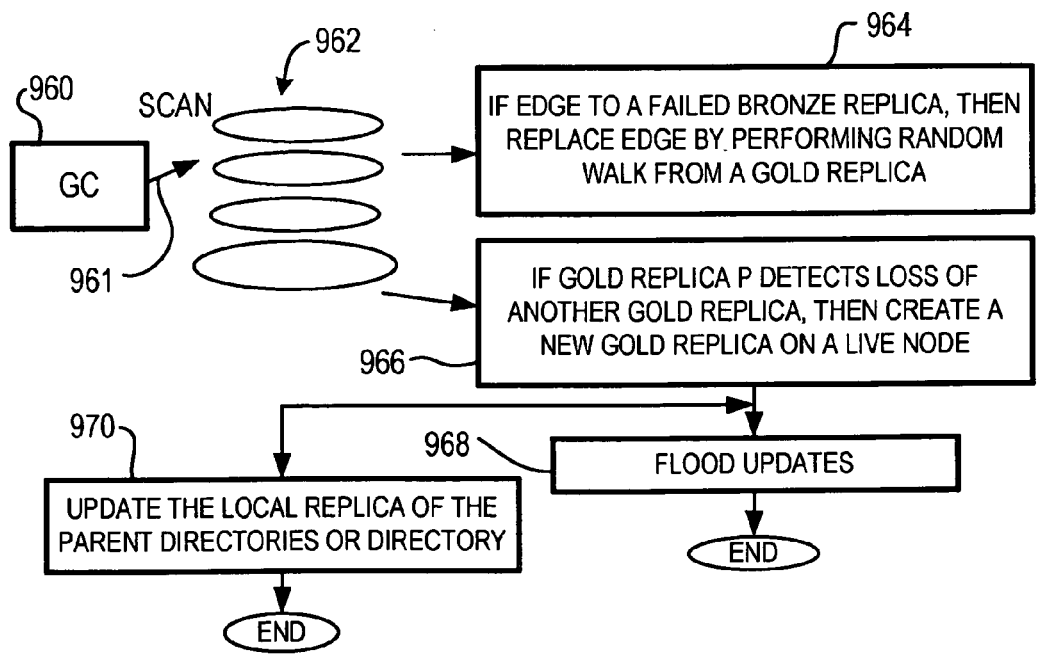

Reference is now made to FIG. 10B. Permanent failures are handled by a garbage collection (GC) module 960 that is typically implemented a node. The GC module periodically scans (961) local disks 962 and discovers replicas that have edges to permanently failed nodes. When the GC module finds an edge to a failed bronze replica, it replaces the edge by performing a random walk starting from a gold replica (Section 4.4). Recovering from a permanent loss of a gold replica is more complex. When a gold replica, say P, detects a permanent loss of another gold replica, gold replica P creates a new gold replica on a live node chosen using the criteria described in Section 4.1 (step 966). Because gold replicas form a clique (Section 3.3), gold replica P can always detect such a loss. This choice is flooded (968) to all the replicas of the file, using the protocol described in Section 5, to let them update their uni-directional links to the gold replicas. Simultaneously, gold replica P updates (970) the local replica of the parent directory(ies), found in its backpointer(s), to reflect gold replica P's new gold replica set. This change is flooded to other replicas of the directories. Rarely, when the system is in transient state, multiple gold replicas may initiate this protocol simultaneously. Such a situation is resolved using the last-writer-wins policy, as described in Section 5.2.

Recovering from a permanent node loss is an inherently expensive procedure, because data stored on the failed node must eventually be re-created somewhere else. The problem is exacerbated in an embodiment of a system of the invention, because it does not have a central authority to manage the locations of replicas—all surviving nodes typically must scan their own disks to discover replicas that require recovery. To lessen the impact, the GC module tries to discover as many replicas that need recovery as possible with a single disk scan. Applicants set the default GC interval to be every three nights, which reduces the scanning overhead dramatically while still offering the expected file availability in the order of six-nines, assuming three gold replicas per file and a mean server lifetime of 290 days (see, William J. Bolosky, John R. Douceur, David Ely, and Marvin Theimer, Feasibility of a Serverless Distributed File System Deployed on an Existing Set of Desktop PCs. *In Conference on Measurement and Modeling of Computer Systems (SIGMETRICS)*, pages 34-43, Santa Clara, Calif., USA, June 2000).

7. System Evaluation

This section evaluates the design and implementation of a system embodiment of the invention, called Pangaea. First, applicants investigate the baseline performance and overheads of Pangaea and show that it performs competitively with other distributed file systems, even in a LAN (local area network). Further, applicants measure the latency, network economy, and availability of Pangaea in a wide-area networking environment in the following ways:

Applicants study the latency of Pangaea using two workloads: a personal workload (Andrew benchmark) and a BBS-like workload involving extensive data sharing.

For the personal workload, applicants show that the user sees only local access latency on a node connected to a slow network and that roaming users can benefit by fetching their personal data from nearby sources. Using the second workload, applicants show that as a file is shared by more users, Pangaea progressively lowers the access latency by transferring data between nearby clients.

Applicants demonstrate network economy by studying how updates are propagated for widely shared files. Applicants show that Pangaea transfers data predominantly over fast links.

To demonstrate the effect of pervasive replication on the availability of the system, applicants analyze traces from a file server and show that Pangaea disturbs users far less than traditional replication policies.

7.1 Prototype Implementation

Applicants have implemented Pangaea as a user-space NFS (version 3) server using the SFS toolkit(see, David Mazieres, A toolkit for user-level file systems, in *USENIX Annual Tech. Conf.*, Boston, Mass., USA, June 2001). The prototype implements all the features described in the paper. Pangaea currently comprises of 30,000 lines of C++ code. A Pangaea server maintains three types of files on the local file system: data files, the metadata file, and the intention-log file. A data file is created for each replica of a file or directory. The node-wide metadata file keeps the extended attributes of all replicas stored on the server, including graph edges and version vectors. Data files for directories and the metadata file are both implemented using the Berkeley DB library (Sleepycat Software, The Berkeley database, 2002) that maintains a hash table in a file. The intention-log file is also implemented using the Berkeley DB to record update operations that must survive a node crash. All the Berkeley DB files are managed using its environments feature that supports transactions through low-level logging. This architecture allows metadata changes to multiple files to be flushed with a sequential write to the low-level log.

7.2 Experimental Settings

Applicants compared Pangaea to Linux's in-kernel NFS version 3 server and Coda, all running on Linux-2.4.18, with ext3 as the native file system.

Applicants let each Pangaea server serve only clients on the same node. Both Pangaea and NFS flush buffers synchronously to disk before replying to a client, as required by the NFS specifications (see, B. Callaghan, B. Pawlowski, and P. Stauhach, RFC1813: NFS version 3 protocol specification, June 1995). Coda supports two main modes of operation: strongly connected mode (denoted coda-s hereafter) that provides open-close semantics, and weakly connected mode (denoted coda-2 hereafter) that improves the response-time of write operations by asynchronously trickling updates to the server. Applicants mainly evaluated coda-w, since its semantics are closer to Pangaea's.

TABLE 2

| Type | # | CPU | Disk | Memory |
|------|---|-----|------|--------|
| A | 2 | 730 MHz | Quantum Atlas 9WLS | 256 MB |
| B | 3 | 1.8 GHz | Quantum Atlas TW367L | 512 MB |
| C | 4 | 400 MHz | Seagate Cheetah 39236LW | 256 MB |

Table 2 shows the machines used by applicants for the evaluation. The type and number of PCs used in the experiments are listed in the table. All the CPUs are versions of Pentiums. All the machines are physically connected by a 100

Mb/s Ethernet. Disks on all the machines are large enough that replicas never had to be purged in either Pangaea or Coda. For NFS and Coda, applicants configured a single server on a type-A machine. Other machines are used as clients. For Pangaea, all machines are used as servers and applications access files from their local servers. For CPU-intensive workloads (i.e., Andrew), applicants used a type-A machine for all the experiments. The other experiments are completely network-bound, and thus they are insensitive to CPU speeds.

For applicant's wide-area experiments, applicants built a simulated WAN to evaluate Pangaea reliably in a variety of networking conditions. Applicants routed packets to a type-B FreeBSD node (not included in the table) running Dummynet (Luigi Rizzo, Dummynet, 2001) to add artificial delays and bandwidth restrictions. This router node was fast enough never to become a bottleneck in any of the applicants' experiments.

7.3 Baseline Performance in a LAN

This section evaluates Pangaea's performance in a LAN using a sequential workload without data sharing. While such an environment is not Pangaea's main target, applicants conducted this study to test Pangaea's ability to serve people's daily storage needs and to understand the system's behavior in an idealized situation.

Applicants created a variation of the Andrew benchmark that simulates a single-person, engineering-oriented workload. This benchmark is available from. It has the same mix of operations as the original Andrew benchmark (John Howard, Michael Kazar, Sherri Menees, David Nichols, M. Satyanarayanan, Robert Sidebotham, and Micahel West, Scale and performance in a distributed file system, *ACM Trans. on Comp. Sys.* (*TOCS*), 6(1), 1988), but the volume of the data is expanded twenty-fold to allow for accurate measurements on modern hardware. This benchmark, denoted Andrew-Tcl hereafter, comprising five stages: (1) mkdir: creating 200 directories, (2) copy: copying the Tcl-8.4 source files from one directory to another, (3) stat: doing "ls–1" on the source files, (4) grep: doing "du" and "grep" on the source files, and (5) compile: compiling the source code. Applicants averaged results from four runs per system, with 95% confidence interval below 3% for all the numbers presented.

FIG. 11 is a table showing the time to complete the benchmark (i.e., Tcl benchmark results in a LAN environment). The numbers are in seconds. Label pang-N shows Pangaea's performance when it creates N replicas for each new file. Ext3 is Linux's native (local) file system. Throughout the evaluation, label pang-N stands for a Pangaea system with N (gold) replicas per file. Pangaea's performance is comparable to NFS. This is as expected, because both systems perform about the same amount of buffer flushing, which is the main source of overhead. Pangaea is substantially slower only in mkdir. This is because Pangaea must create a Berkeley DB file for each new directory, which is a relatively expensive operation. Pangaea's performance is mostly independent of a file's replication factor, thanks to optimistic replication, where most of the replication processing happens in the background.

Coda's weakly connected mode (coda-w) is very fast. This is due to implementation differences: whereas Pangaea and NFS flush buffers to disk after every update operation, Coda avoids that by intercepting low-level file-access (VFS) requests using a small in-kernel module.

Figure 12:
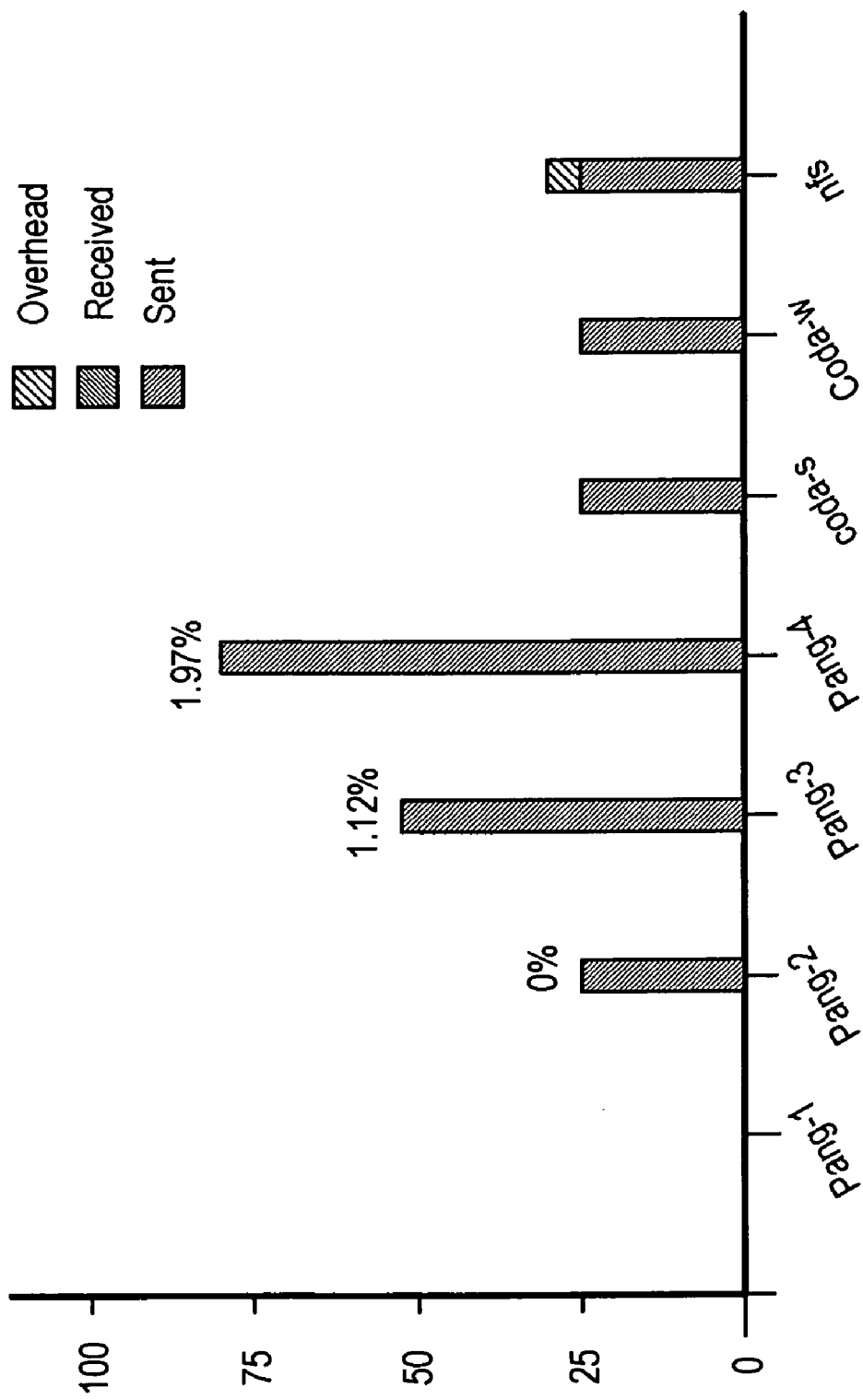
FIG. 12 is a graph showing the network bandwidth used during the Andrew benchmark, in accordance with embodiments of the invention.

FIG. 12 shows the network bandwidth used during the Andrew benchmark. "Overhead" is defined to be harbingers and update messages that turn out to be duplicates. The overhead bars show bytes consumed by harbingers and duplicate updates. The numbers above the bars show the percentage of overhead. Pang-1 does not involve any network activity since it stores files only on the local server. Numbers for pang-3 and pang-4 show the effect of Pangaea's harbinger algorithm in conserving network-bandwidth usage. In this benchmark, because all replicas are gold and they form a clique, Pangaea would have consumed 4 to 9 times the bandwidth of pang-2 were it not for harbingers. Instead, its network usage is near-optimal, with less than 2% of the bandwidth wasted.

FIG. 13 is a table showing network bandwidth consumption for common file-system update operations. The table shows the total number of bytes transmitted between all the nodes for each operation. "Overhead" shows the percentage of the bandwidth used by harbingers and duplicate updates. Operations such as creating a file or writing one byte show a high percentage of overhead, since they are sent directly without harbingers, but they have only a minor impact on the overall wasted bandwidth since their size is small. On the other hand, bulk writes, which make up the majority of the overall traffic, incur almost no overhead.

7.4 Performance of Personal Workload in WANs

Figure 14:
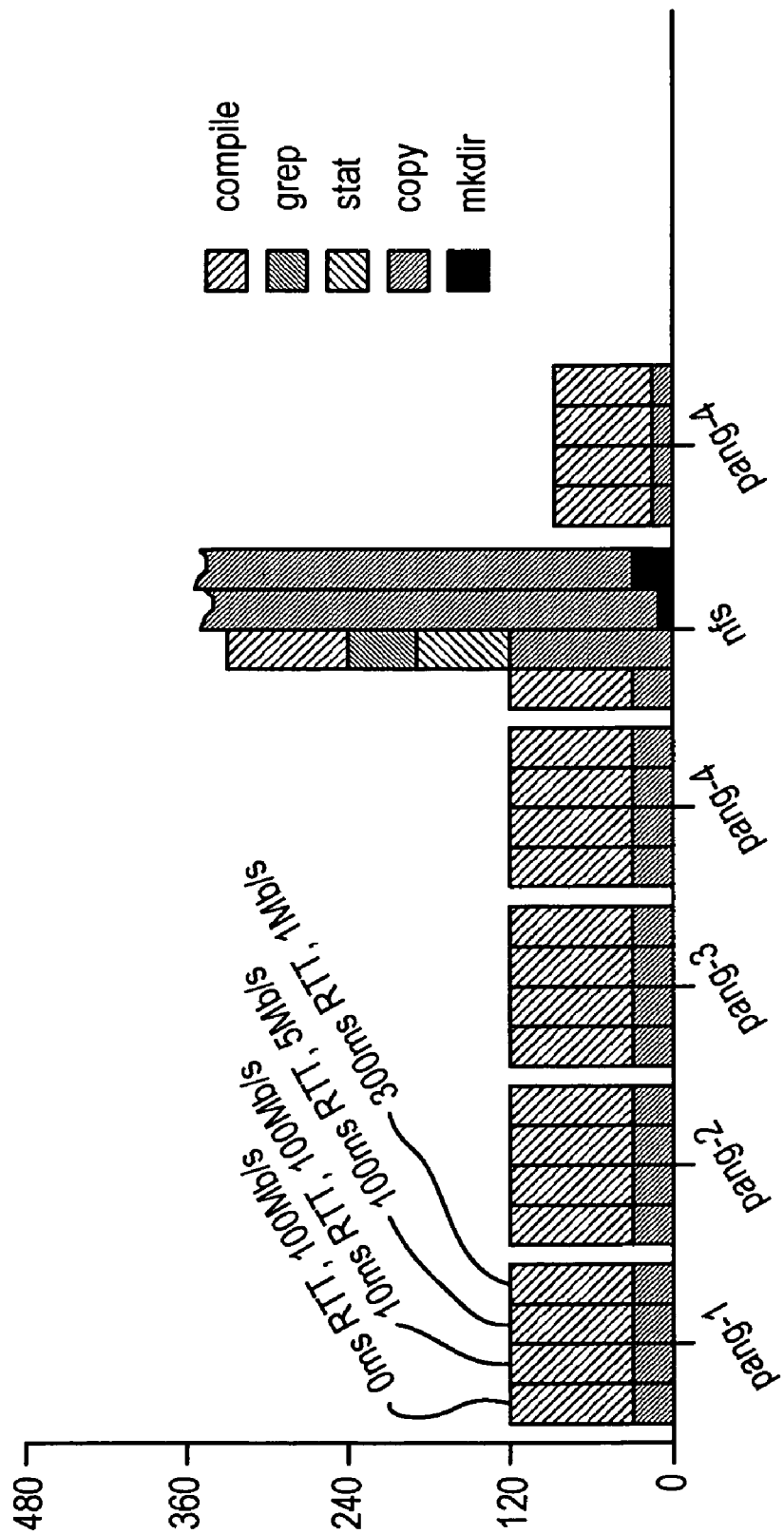
FIG. 14 is a graph showing Andrew-TCl benchmark results on a node with a slow network link, in accordance with an embodiment of the invention.

Applicants ran the Andrew-Tcl benchmark to study the performance of the systems in WANs for a personal workload. Since this workload involves no data sharing, the elapsed time depends (if at all) only on the latency and capacity of the link between the client and the server. FIG. 14 shows the time needed to complete the benchmark. The figure shows the Andrew-Tcl benchmark results on a node with a slow network link. The labels next to the bars indicate the link speeds. For Pangaea, these are the links between any two servers; for NFS and Coda, they are the links between clients and server. NFS took 1939 seconds in a 5 Mb/s network, and it did not finish after two hours in a 1 Mb/s network.

Pangaea and Coda totally hide the network latency, because the benchmark is designed so that it reads all the source data from the local disk, and the two systems can propagate updates to other. nodes in the background. On the other hand, the performance of NFS degrades severely across slow links.

7.5 Roaming

Roaming, i.e., a single user moving between different nodes, is an important use of distributed file systems. Applicants expect Pangaea to perform well in non-uniform networks in which nodes are connected with networks of different speeds. Applicants simulated roaming using three nodes: S, which stores the files initially and is the server in the case of Coda, and two type-A nodes, C1 and C2. Applicants first ran the Andrew-Tcl benchmark to completion on node C1, delete the *.o files, and then re-run only the compilation stage of the benchmark on node C2. Applicants varied two parameters: the link speed between C1 and C2, and the link speed between them and S. As seen from FIG. 14, the performance depends, if at all, only on these two parameters.

Figure 15:
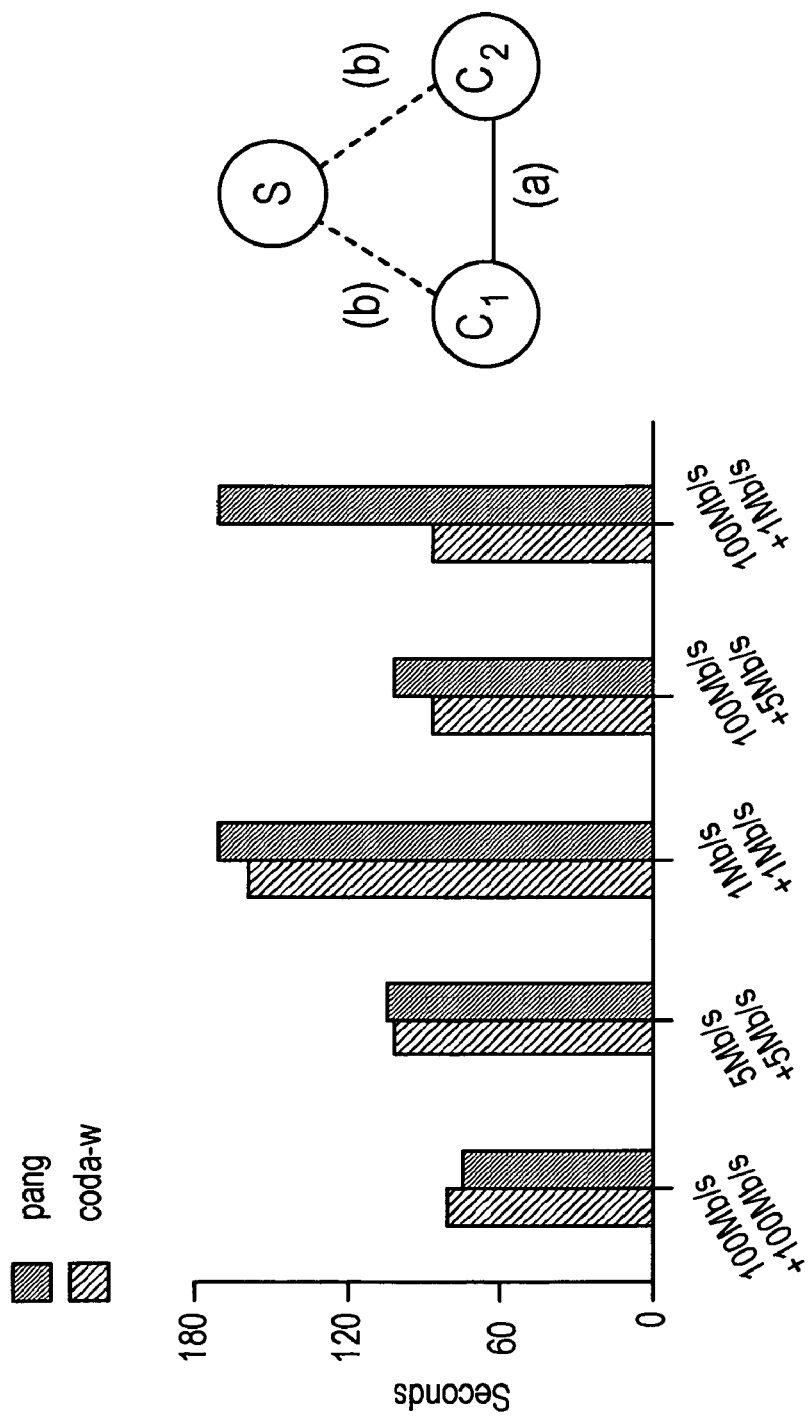
FIG. 15 is a graph illustrating the result of recompiling the Tcl source code, in accordance with an embodiment of the invention.

FIG. 15 shows the results (i.e., the result of recompiling the Tcl source code). The numbers 100 Mb/s+1 Mb/s, for example, indicate that the link between the two client nodes (link (a) in the right-side picture) is 100 Mb/s, and the link between the benchmark client and the server (link (b)) is 1 Mb/s. The speed of other links is irrelevant in this instance. FIG. 15 shows that when the network is uniform, i.e., when the nodes are placed either all close by or all far apart, Pangaea and Coda perform comparably. However, in non-uniform networks, Pangaea achieves better performance than Coda by transferring data between nearby nodes. In contrast, Coda clients always fetch data from the server. (Pangaea actually performs slightly better in uniformly slow networks.

Applicants surmise that the reason is that Pangaea uses TCP for data transfer, whereas Coda uses its own UDP-based protocol.)

7.6 Data Sharing in Non-uniform Environments

The workload characteristics of wide-area collaboration systems are not well known. Applicants thus created a synthetic benchmark modeled after a bulletin-board system. In this benchmark, articles (files) are continuously posted or updated from nodes chosen uniformly at random; other randomly chosen nodes (i.e., users) fetch new articles not yet read. A file system's performance is measured by two metrics: the mean latency of reading a file never accessed before by the server, and the wide-area network bandwidth consumption for files that are updated. These two numbers depend, if at all, only on the file size, the number of existing replicas (since Pangaea can perform short-cut creation), and the order in which these replicas are created (since it affects the shape of the graph). Applicants choose an article size of approximately 50 KB, a size typical in Usenet (see, Yasushi Saito, Jeffrey Mogul, and Ben Verghese, A Usenet performance study, September 1998). Applicants averaged out the final parameter by creating and reading about 1000 random files for each sample point and computing the mean. Applicants ran both article posters and readers at a constant speed (≈5 articles posted or read/second), because the performance metrics are independent of request inter-arrival time.

Figure 16:
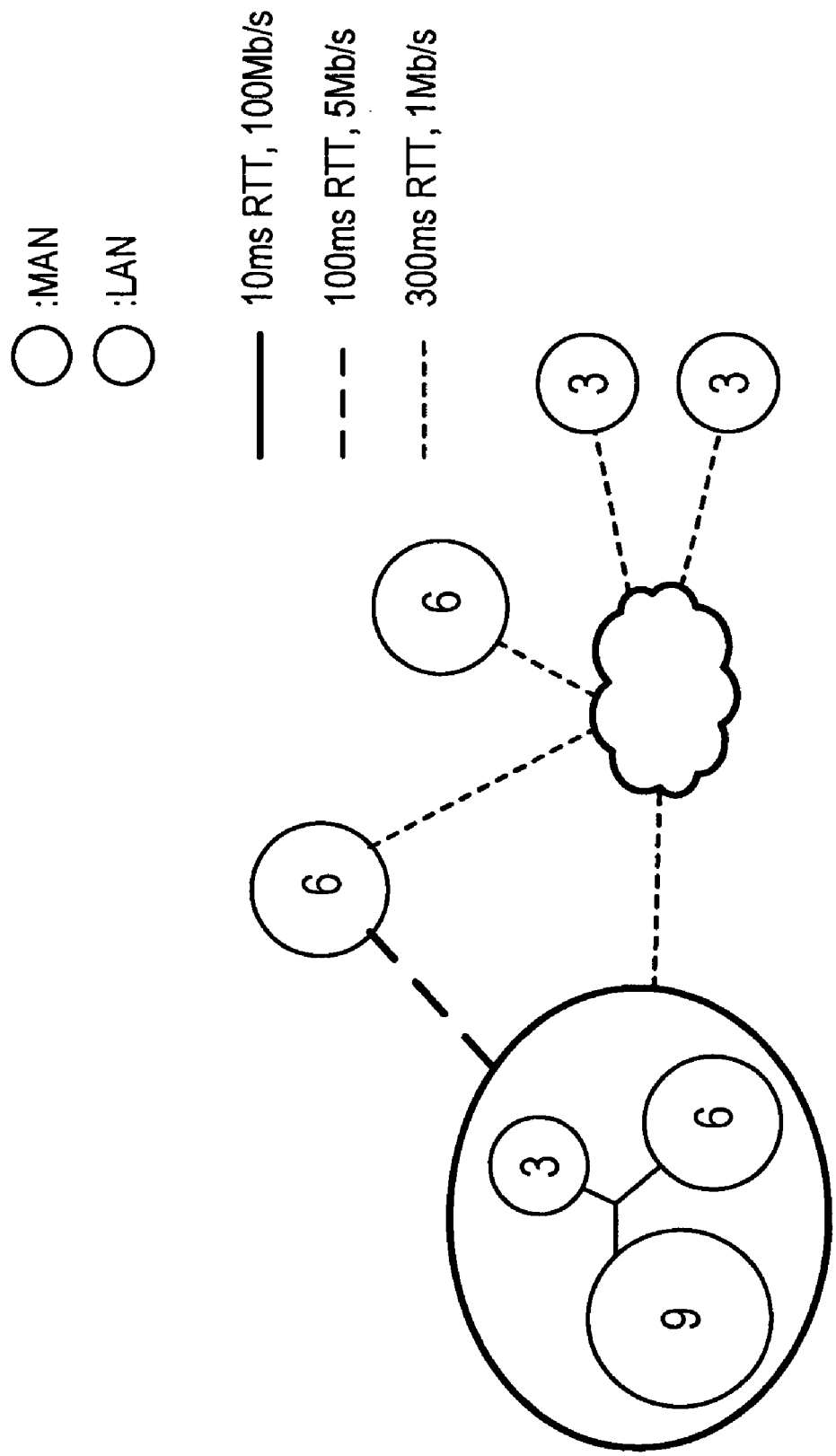
FIG. 16 is a block diagram of a simulated network configuration modeled after a particular network, in accordance with an embodiment of the invention.

In this benchmark, applicants ran multiple servers in a single (physical) node to build a configuration with a realistic size. To avoid overloading the CPU or the disk, applicants choose to run six virtual servers on a type-B machine (Table 2), and three virtual servers on each of other machines, with the total of 36 servers on 9 physical nodes. FIG. 16 shows the simulated geographical distribution of nodes, modeled after Hewlett-Packard's corporate network. The gray circle represents, for example, the San Francisco Bay Area metropolitan-area network (MAN), the upper bubble represents Bristol (UK), and the other bubbles represent India, Israel, and Japan. The number in a circle shows the number of servers running in the LAN. For the same logistical reasons, instead of Coda, applicants compared three versions of Pangaea:

pang: Pangaea with three gold replicas per new file.
hub: This configuration centralizes replica management by creating, for each file, one gold replica on a server chosen from available servers uniformly at random. Bronze replicas connect only to the gold replica. Updates can still be issued at any replica, but they are all routed through the gold replica. This roughly corresponds to Coda.
random: This configuration creates a graph by using simple random walks without considering either gold replicas or network proximity. It is chosen to test the effect of Pangaea's graph-construction policy.

Figure 17:
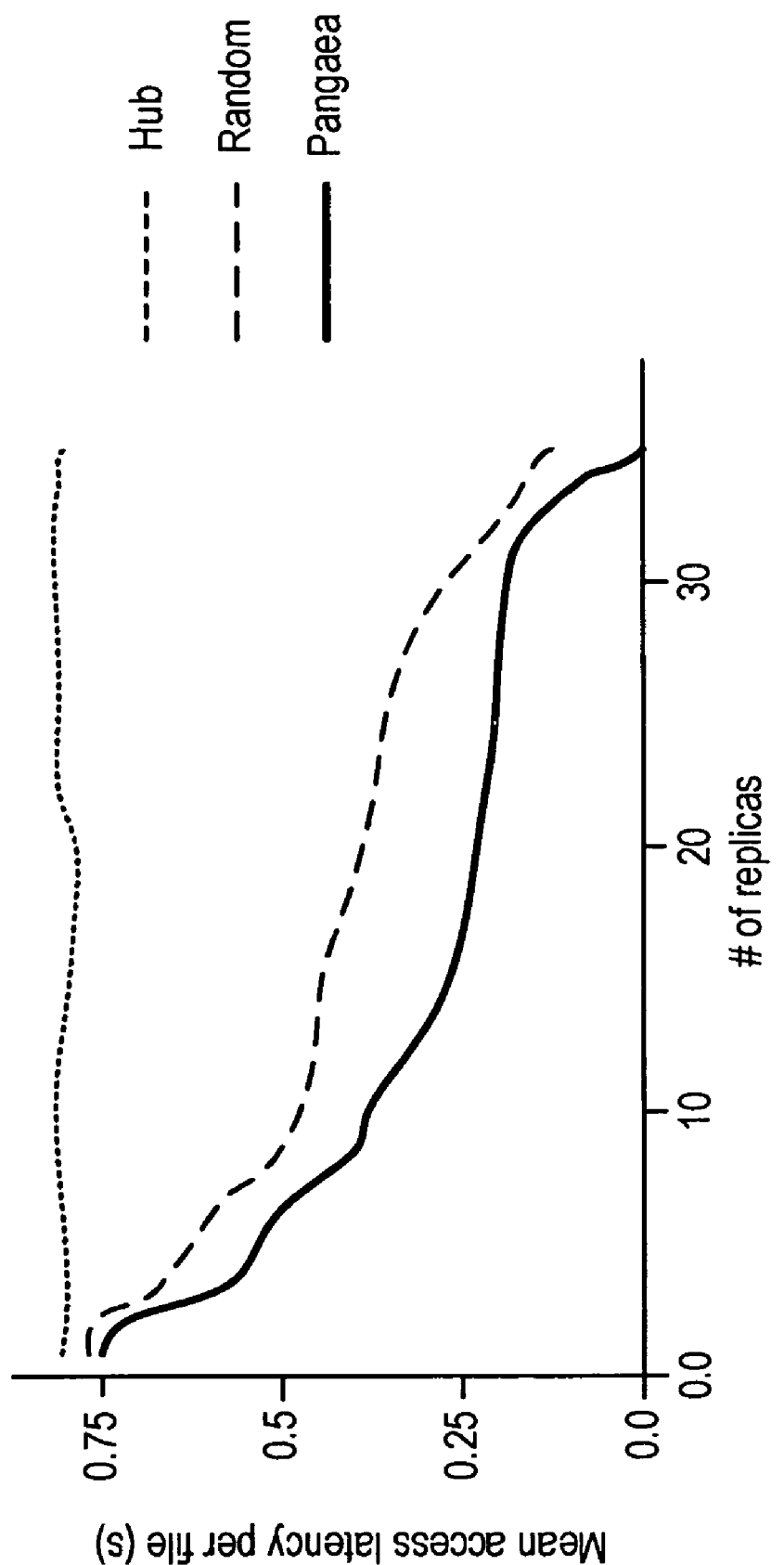
FIG. 17 is a graph illustrating the average time needed to read a new file in a collaborative environment, in accordance with an embodiment of the invention.

Applicants expect Pangaea's access latency to be reduced as more replicas are added, since that increases the chance of file contents being transferred to a new replica from a nearby existing replica. FIG. 17 confirms this prediction, which shows the average time needed to read a new file in a collaborative environment. The X axis shows the number of existing replicas of a file. The Y axis shows the mean latency to access a file on a node that does not yet store a replica of the file.

In contrast, the hub configuration shows no speedup no matter how many replicas of a file exist, because it always fetches data from the central replica.

Figure 18:
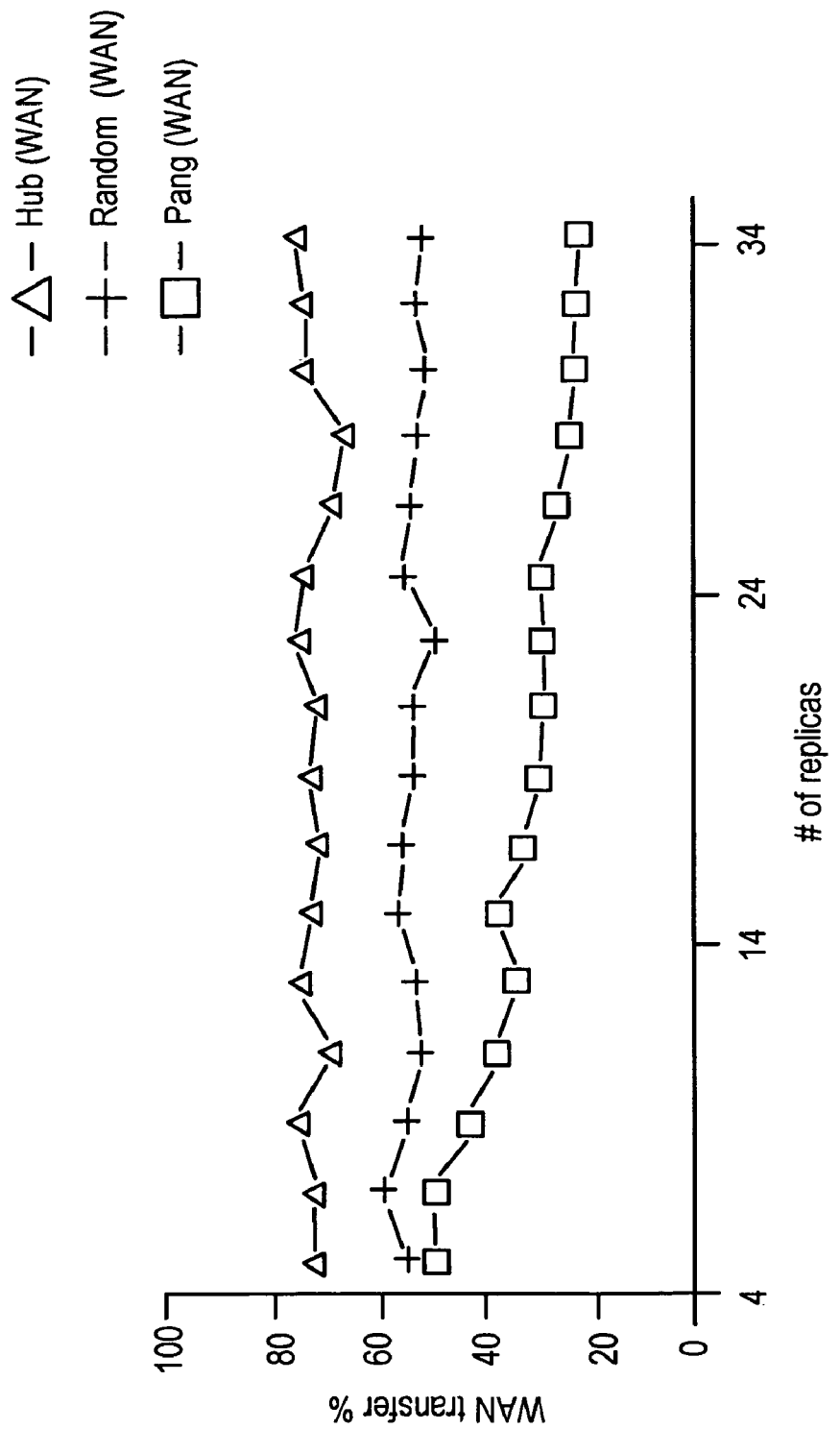
FIG. 18 is a graph showing the wide-area network bandwidth consumption during file updates, in accordance with an embodiment of the invention.

FIG. 18 shows the wide-area network bandwidth consumption during file updates. The Y axis shows the percentage of traffic routed through the indicated networks. "WAN+MAN" shows the traffic that flowed through non-LAN (i.e., those with $\geq$10 ms RTT), whereas "WAN" shows the traffic that flowed through networks with $\geq$180 ms RTT (see also FIG. 16).

Although all the systems consume the same total amount of traffic per update (i.e., (#-of-replicas-1)*filesize), Pangaea uses far less wide-area network traffic since it transfers data preferentially along fast links using dynamic spanning-tree construction (Section 5.1.3). This trend becomes accentuated as more replicas are created.

Figure 19:
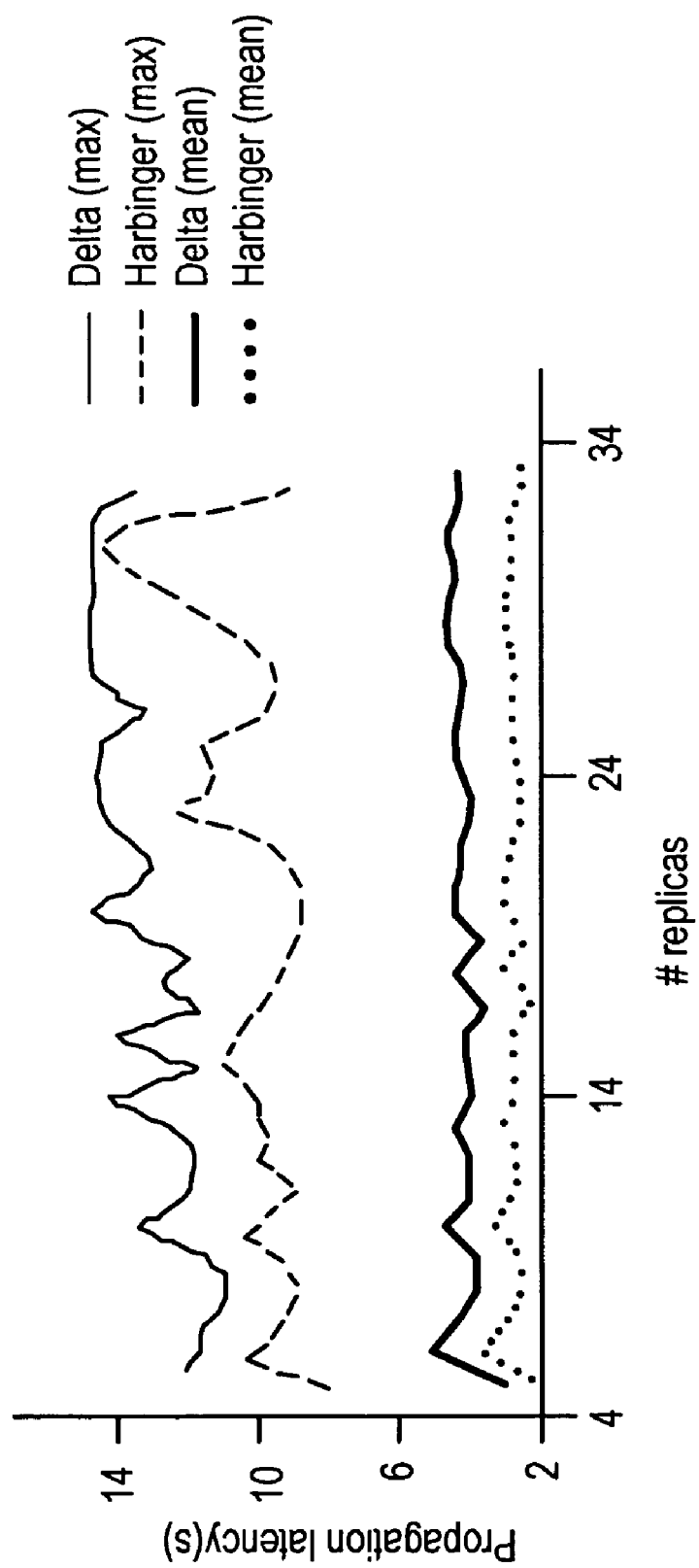
FIG. 19 is a graph showing the time that the pang configuration took to propagate updates to replicas of files during the same experiment, in accordance with an embodiment of the invention.

FIG. 19 shows the time that the pang configuration took to propagate updates to replicas of files during the same experiment. The dashed lines show the time needed to distribute harbingers to replicas. They represent the window of inconsistency (i.e., time before which users may observe old contents). The solid lines represent the time needed to distribute actual updates. They represent the number of seconds users wait before seeing the new contents. The "mean" lines show the mean time needed for an update issued at one replica to arrive at all replicas, for a file with a specific number of replicas. The "max" lines show the maximum time observed for an update to arrive at all replicas of the file.

The "max" lines show large fluctuations, because updates must travel over approximately 300 ms RTT links multiple times using TCP. Both numbers are independent of the number of replicas, because (given a specific network configuration) the propagation delay depends only on the graph diameter, which is three, in this configuration. Applicants believe that 4 seconds average/15 seconds maximum delay for propagating 50 KB of contents over 300 ms, 1 Mb/s links is reasonable. In fact, most of the time is spent in waiting when constructing a spanning tree (Section 5.1.3); cutting the delay parameter would shrink the propagation latency, but potentially would worsen the network bandwidth usage.

7.7 Performance and Network Economy at a Large Scale

The previous section demonstrated Pangaea's ability to fetch data from a nearby source and distribute updates through fast links, yet only at a small scale. This section investigates whether these benefits still hold at a truly large scale, by using a discrete event simulator that runs Pangaea's graph-maintenance and update-distribution algorithms. Applicants extracted performance parameters from the real testbed that was used in the previous section, and ran essentially the same workload as before. Applicants tested two network configurations. The first configuration, called HP, is the same as FIG. 16, but the number of nodes in each LAN is increased eighty-fold, to a total of 3000 nodes. The second configuration, called U, keeps the size of each LAN at six nodes, but it increases the number of regions to 500 and connects regions using 200 ms RTT, 5 Mb/s links.

Figure 20:
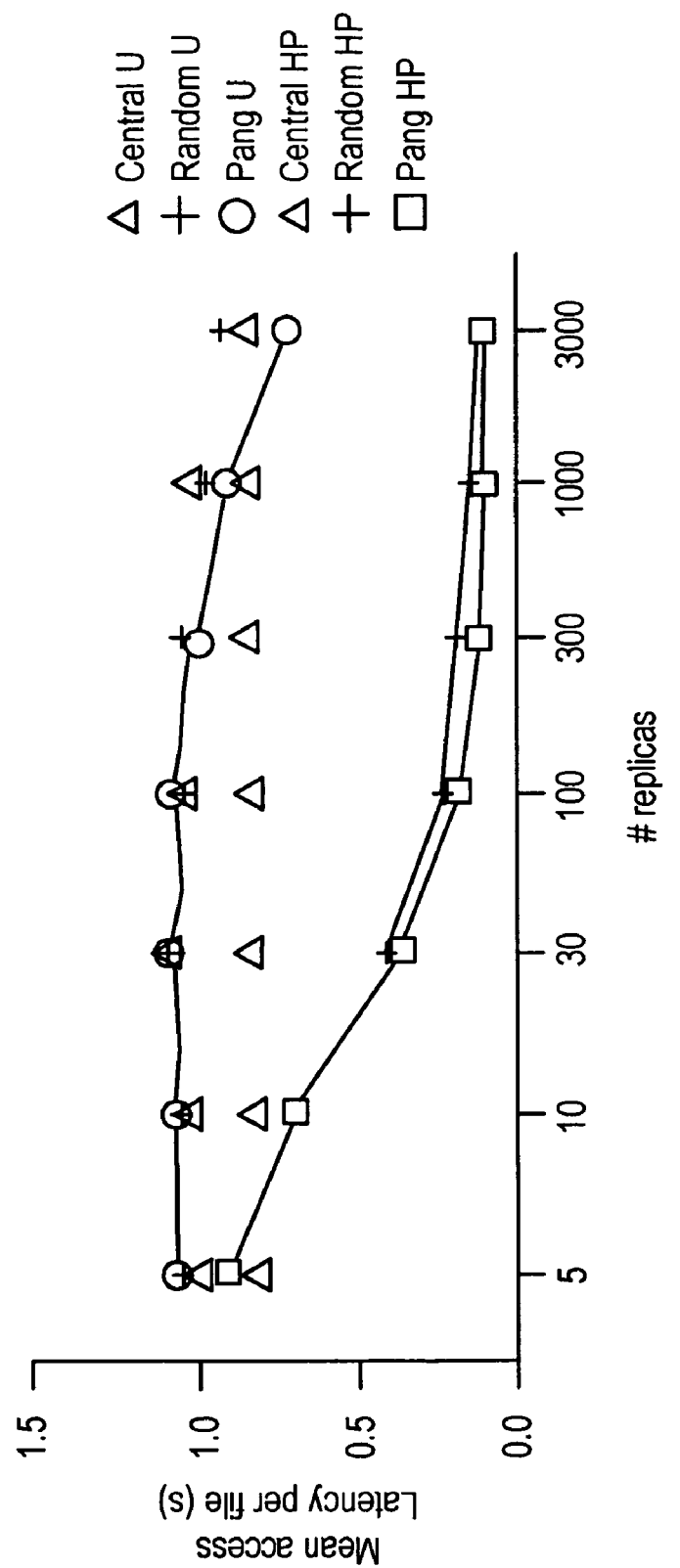
FIG. 20 is a graph showing the file-reading latency in a simulated 3000-node system, in accordance with an embodiment of the invention.
Figure 21:
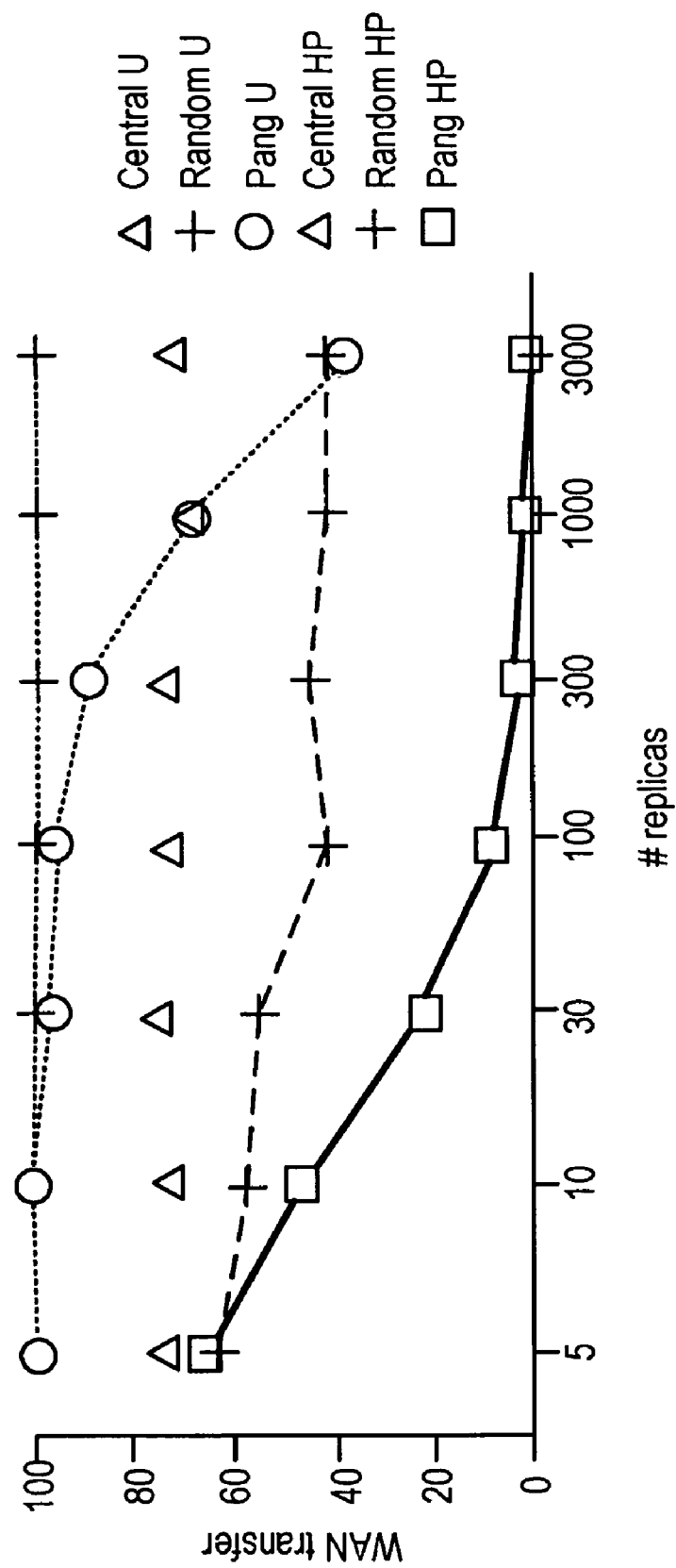
FIG. 21 is a graph showing a wide-area network bandwidth usage during file updates in simulated 3000-node systems, in accordance with an embodiment of the invention.

FIGS. 20 and 21 show average file-read latency and network bandwidth usage in these configurations. FIG. 20 is a graph showing the file-reading latency in a simulated 3000-node system. The meaning of the numbers is the same as in FIG. 17. FIG. 21 is a graph showing a wide-area network bandwidth usage during file updates in simulated 3000-node systems. The meaning of the numbers is the same as in FIG. 18. These figures show the same trend as before, but the differences between the configurations are more pronounced. In particular, in the HP configuration, Pangaea propagates updates almost entirely using local-area network for popular files, since it crosses over wide-area links only a fixed number of times, regardless of the number of replicas. In the U configuration, Pangaea still saves bandwidth, more visibly when many replicas exist. The systems cannot improve read latency much in U, because most of the accesses are forced to go over wide area links, but Pangaea still shows improvement with many replicas.

7.8 Availability Analysis

This section studies the effects of pervasive replication, especially name-space containment, on the system's availability. A Pangaea server replicates not just replicas accessed directly by the users, but also all the intermediate directories needed to look up those replicas. Thus, applicants expect Pangaea to disrupt users less than traditional approaches that replicate files (or directories) on a fixed number of nodes.

Applicants perform trace-based analysis to verify this prediction. Two types of configurations are compared: Pangaea with one to three gold replicas per file, and a system that replicates the entire file system contents on one to four nodes. The trace was collected on a departmental file server, and it contains twenty-four (24) users and 116M total accesses to 566K files (Susan Spence, Erik Riedel, and Magnus Karlsson, Adaptive consistency-patterns of sharing in a networked world, Technical Report HPL-SSP-2002-10, HP Labs, February 2002). To simulate a wide-area workload from this single-node trace, applicants assume that each user is on a different node; thus, all the simulated configurations contain twenty-four (24) nodes. For each configuration, applicants start from an empty file system and feed the first half of the trace to warm the system up. Applicants then artificially introduce remote node crashes or wide-area link failures. To simulate the former situation, applicants crashed one (1) to seven (7) random nodes and redirect accesses by the user on a failed node to another random node. To simulate link failures, in which one to four nodes are isolated from the rest, applicants crashed twenty (20) to twenty-three (23) random nodes and threw away future activities by the users on the crashed nodes. Applicants then ran the second half of the trace and observe how many of the users' sessions can still complete successfully. Applicants define a session to be either a directory operation (i.e., unlink), or a series of system calls to a file between and including open and close. If any one of the system calls fails, applicants consider the session to fail.

Applicants ran simulation 2000 times for each configuration with different random seeds and average the results.

Figure 22:
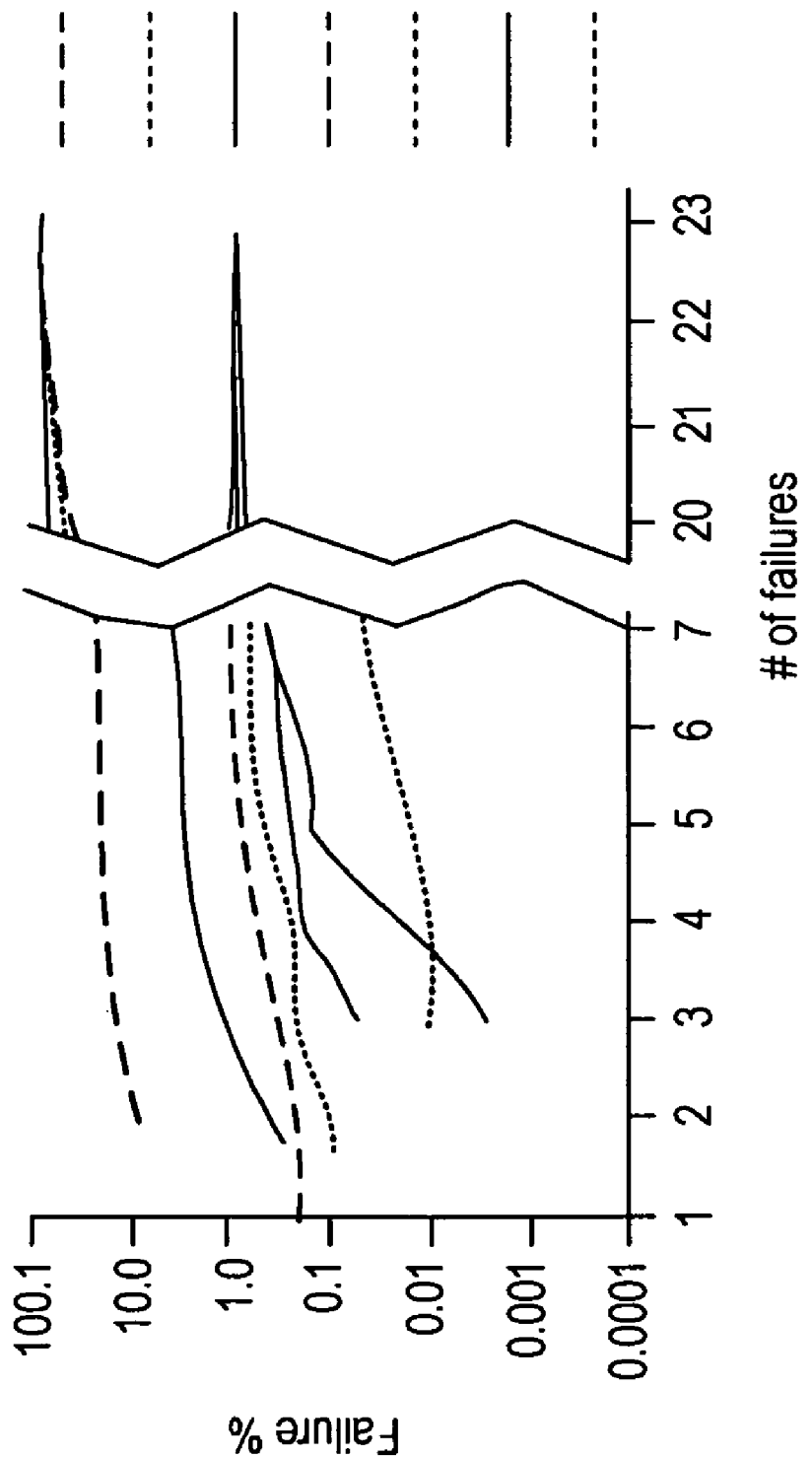
FIG. 22 shows the results of the availability analysis using a file-system trace, in accordance with an embodiment of the invention.

FIG. 22 shows the results of the availability analysis using a file-system trace; the users of a failed node move to a functioning node. The numbers in parentheses show the overall storage consumption, normalized to pang-1. For network partitioning, Pangaea wins by a huge margin; it shows near-100% availability thanks to pervasive replication, whereas the other configurations must rely on remote servers for much of the file operations. For node failures, the differences are smaller. However, applicants can still observe that for the same storage overhead, Pangaea offers better availability.

8. Conclusions

Pangaea is an embodiment of a wide-area file system that targets the needs for data access and sharing of distributed communities of users. It federates commodity computers provided by users. Pangaea is built on three design principles: 1) pervasive replication to provide low-access latency and high availability, 2) randomized graph-based replica management that adapts to changes in the system and conserves WAN bandwidth, and 3) optimistic consistency that allows users to access data at any time, from anywhere.

The evaluation of Pangaea shows that Pangaea is as fast and as efficient as other distributed file systems, even in a LAN. The benefits of pervasive replication and the adaptive graph-based protocols become clear in heterogeneous environments that are typical of the Internet and large intranets. In these environments, Pangaea outperforms existing systems in three aspects: access latency, efficient usage of WAN bandwidth, and file availability.

The various engines or modules discussed herein may also be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for a wide area file system, the apparatus comprising:
 a plurality of distributed nodes configured to create a peer-to-peer wide-area file system that allows read and write accesses of files maintained in said file system; and
 wherein a node of the plurality of distributed nodes is configured to select m existing replicas for a file contained in the file system, where m is an integer that is at least 3, to select an existing replica closest to the node, and to select m−2 replicas by a random traversal from the existing replica closest to the node.

2. The apparatus of claim 1, wherein the nodes are configured to maintain a graph of replicas of files contained in said file system.

3. The apparatus of claim 1, wherein the nodes are configured to propagate updates on a per-file basis.

4. The apparatus of claim 2, wherein the nodes are configured to exchanging updates in a peer-to-peer fashion.

5. The apparatus of claim 1, wherein the nodes are configured to create a replica of a file in said file system whenever the file is accessed.

6. The apparatus of claim 5, wherein the file comprises a directory.

7. The apparatus of claim 5, wherein the file comprises data.

8. The apparatus of claim 2, wherein the replicas include core replicas.

9. The apparatus of claim 8 wherein a core replica is related to maintenance of a hierarchical name space.

10. The apparatus of claim 2, wherein the replicas include non-core replicas.

11. The apparatus of claim 1, wherein the nodes are configured to remove an inactive replica.

12. The apparatus of claim 1, wherein the nodes are configured to randomly select a plurality of replicas.

13. The apparatus of claim 12, wherein a plurality of regions includes at least one of the selected replicas.

14. The apparatus of claim 12, wherein a local region includes at least one of the selected replicas.

15. The apparatus of claim 1, wherein the nodes are configured to add a non-core replica to the graph.

* * * * *

UNITED STATES PATENT AND TRADEMARK OFFICE
CERTIFICATE OF CORRECTION

PATENT NO. : 8,315,975 B2
APPLICATION NO. : 10/315583
DATED : November 20, 2012
INVENTOR(S) : Yasushi Saito et al.

It is certified that error appears in the above-identified patent and that said Letters Patent is hereby corrected as shown below:

In the Specifications:

In column 6, line 13, delete "method" and insert -- methods --, therefor.

In column 9, line 5, delete "director/" and insert -- directory/ --, therefor.

In column 9, line 6, delete "(201)-and" and insert -- (201) and --, therefor.

In column 9, line 14, delete "plan" and insert -- play --, therefor.

In column 9, line 17, delete "director" and insert -- directory --, therefor.

In column 17, line 66, after "shows" insert -- the replica's timestamp. The attribute "bp=[50,foo]" shows --.

In column 17, line 66, delete "replicate" and insert -- replica --, therefor.

In column 18, line 1, delete ""d-{51,foo,4}"" and insert -- "d={51,foo,4}" --, therefor.

In column 18, line 1, delete "director" and insert -- directory --, therefor.

In column 18, line 7, after "(see FIG. 9(3))" insert -- than Alice's (ts=8) (see FIG. 9(2)) --.

In column 20, line 52, delete "coda-2" and insert -- coda-w --, therefor.

Signed and Sealed this
Fourteenth Day of May, 2013

Teresa Stanek Rea
*Acting Director of the United States Patent and Trademark Office*